(12) United States Patent
Iida et al.

(10) Patent No.: US 7,333,912 B2
(45) Date of Patent: Feb. 19, 2008

(54) MULTIPLE SENSOR SYSTEM

(75) Inventors: Yusuke Iida, Ayabe (JP); Yuichi Inoue, Kyoto (JP); Nobuharu Ishikawa, Takahatsuki (JP); Toru Hosoda, Ayabe (JP)

(73) Assignee: Omron Corporation, Kyoto-Shi (JP)

( * ) Notice: Subject to any disclaimer, the term of this patent is extended or adjusted under 35 U.S.C. 154(b) by 135 days.

(21) Appl. No.: 11/384,439

(22) Filed: Mar. 21, 2006

(65) Prior Publication Data

US 2006/0224354 A1 Oct. 5, 2006

Related U.S. Application Data

(62) Division of application No. 10/942,083, filed on Sep. 16, 2004, now Pat. No. 7,092,842.

(30) Foreign Application Priority Data

Sep. 19, 2003 (JP) ............... 2003-329182
Apr. 15, 2004 (JP) ............... 2004-119781

(51) Int. Cl.
*G01B 7/00* (2006.01)
(52) U.S. Cl. .............. 702/155; 700/303; 700/177
(58) Field of Classification Search ............. 702/155; 700/303, 177
See application file for complete search history.

(56) References Cited

U.S. PATENT DOCUMENTS 4,107,654 A * 8/1978 Nishijima .............. 340/825.23
4,484,287 A * 11/1984 Gamo et al. ............ 700/177
5,034,579 A 7/1991 Rowland
2001/0055063 A1 12/2001 Nagai et al.

FOREIGN PATENT DOCUMENTS

JP 2003-99278 4/2003

* cited by examiner

*Primary Examiner*—John Barlow
*Assistant Examiner*—Sujoy Kundu
(74) *Attorney, Agent, or Firm*—Foley & Lardner LLP

(57) ABSTRACT

An extension unit provided adjacent to an amp unit comprises a measurement data accumulation memory, a measurement data acquiring part for acquiring measurement data coming through a transmission line and accumulating it in the above memory, a data analyzing part for analyzing an accumulated series of measurement data according to predetermined algorithm, a determining part for determining a data analyzed result, and an output part for outputting a control signal corresponding to a determined result to the outside. A plurality of process programs in which measurement algorithm is segmentalized are incorporated in the extension unit and a process program is selected according to a command from a personal computer and the selected process program is performed in a predetermined order.

10 Claims, 33 Drawing Sheets

Perspective view taken obliquely from front

Perspective view taken obliquely from behind

Fig. 10

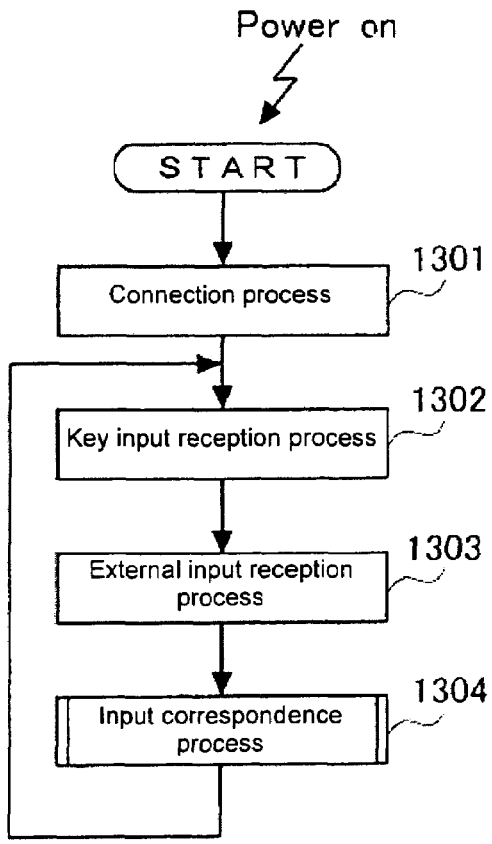
Fig. 13A  Normal processes
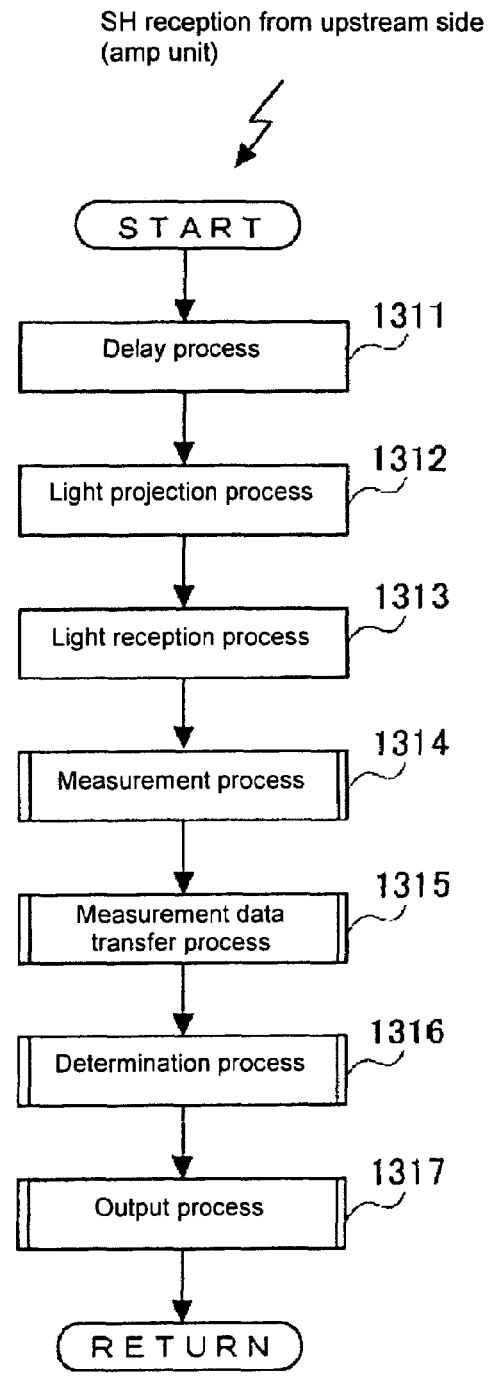
Fig. 13B  SH-reception interrupt processes

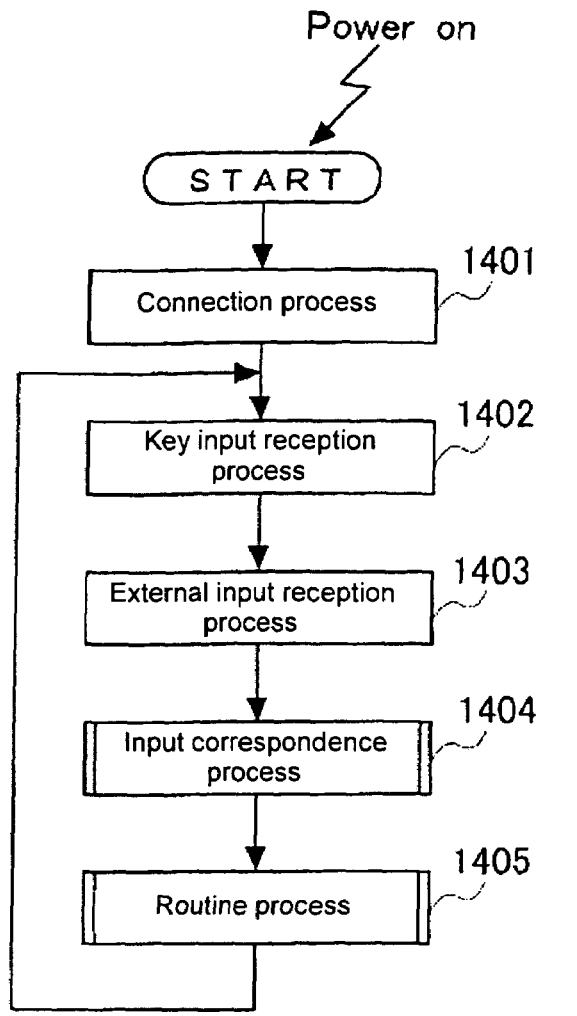
Fig. 14A  Normal processes
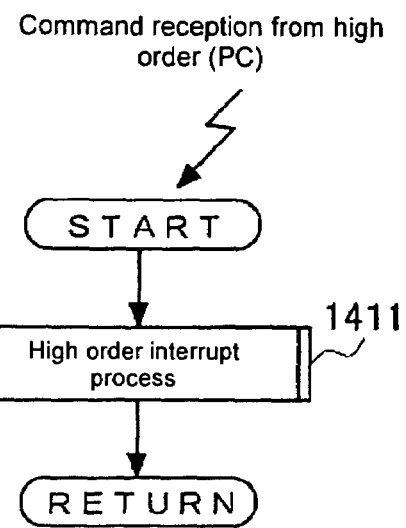
Fig. 14B  High order interrupt process
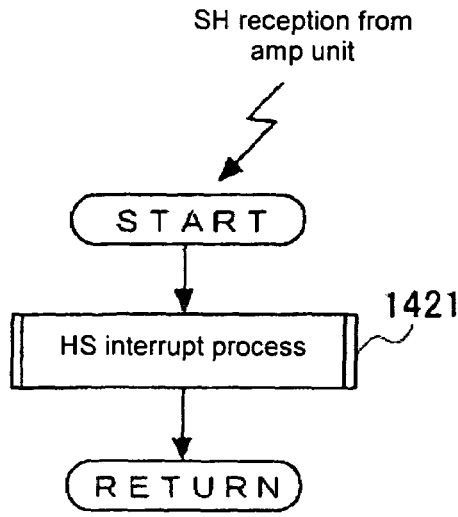
Fig. 14C  HS reception interrupt processes Fig. 17A
Accumulation timing of
display data
Fig. 17B
Accumulation timing of
measurement data
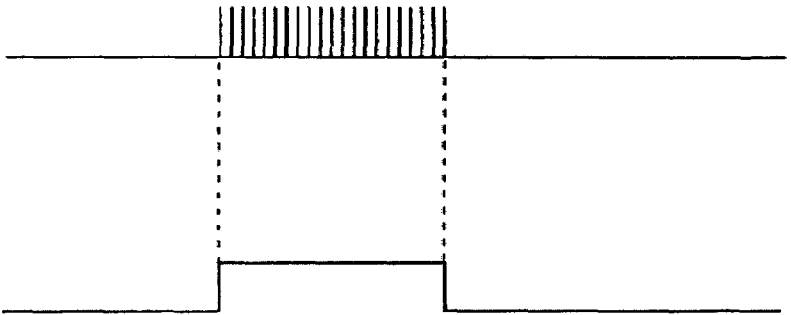
Fig. 17C
Accumulation condition of
measurement data

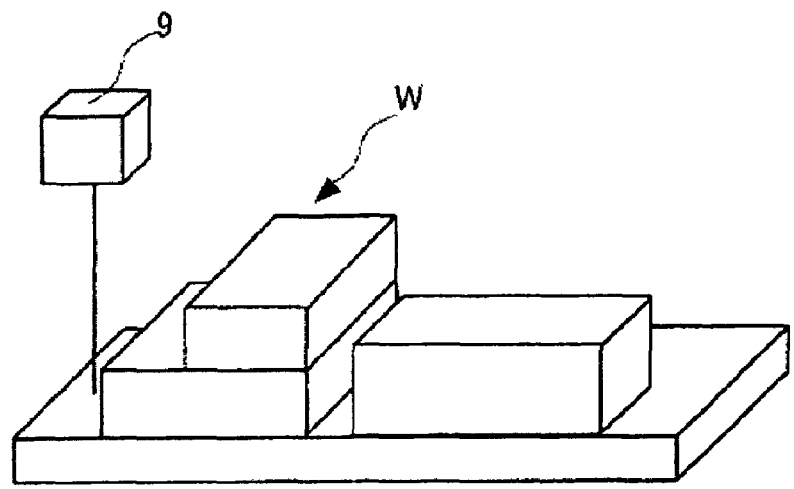
Fig. 19A  Measurement object
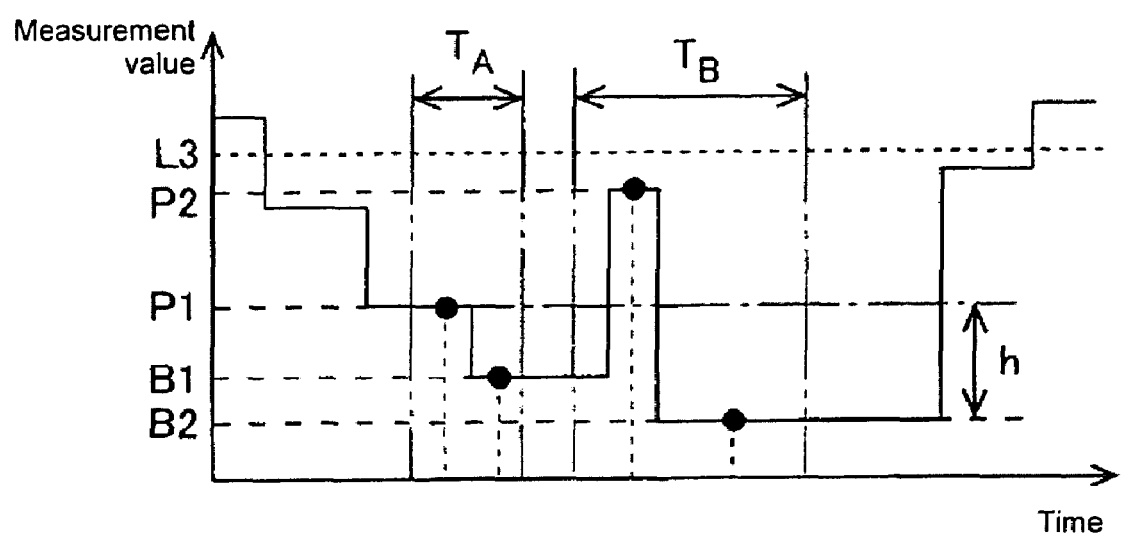
Fig. 19B  Analysis result

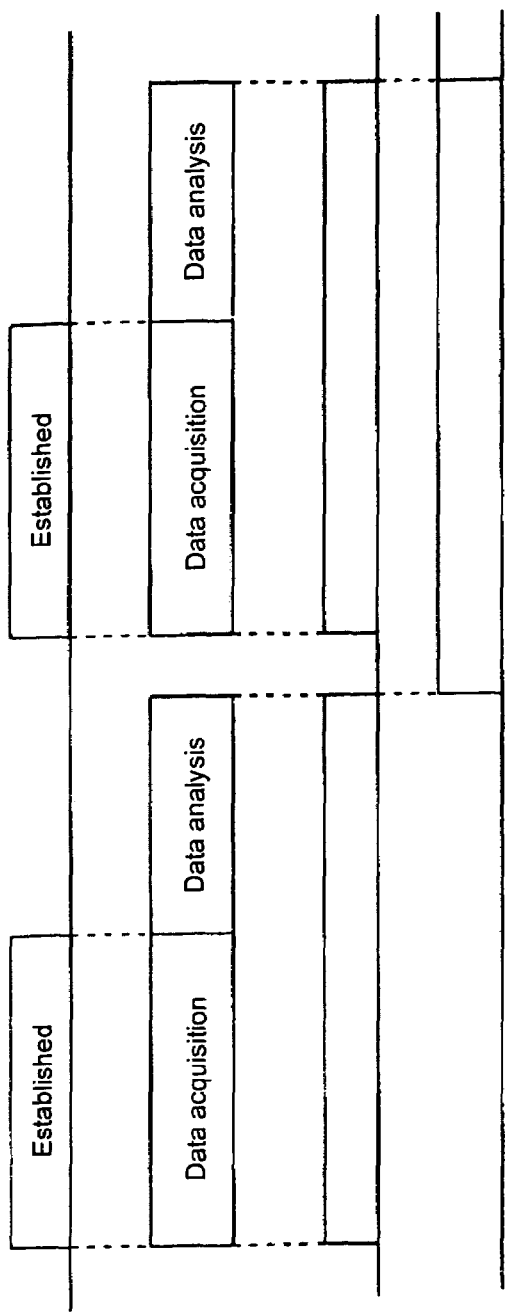

Fig. 23

| (a) Name of process category | (b) Process program No. | (c) Process program list [the contents in brackets are main parameters] |
|---|---|---|
| [Trigger control category] | (0) | Trigger mode (triggerless/St trigger/HG trigger) |
| [Waveform shaping category] | (0)<br>(1)<br>(2)<br>(3) | Moving average, Median, Differentiation, Filter (BPF) |
| [Characteristic point extraction category] | (0)<br>(1)<br>(2)<br>⋯<br>(9) | ST hold (Peak/peak to peak/average/sample)<br>ST top/valley<br>Peak/bottom, Peak to peak, Average, Sample<br>Top/valley, Top/valley interval<br>Edge, Edge interval, Edge center |
| [Calculation category] | (0)<br>(1)<br>(2)<br>⋯<br>(9) | One point position, One point position, B, Two point addition, Two point step difference<br>Pinched thickness, Two points length, Moving speed<br>Three points step difference, Area, Area, B<br>Average, Maximum/Minimum, Total, Absolute value |
| [Determination (OUT) category] | (0)<br>⋯<br>(4) | Determination (H threshold value/L threshold value/Amount of hysteresis/Zero reset reference value) |
| [External output setting category] | (0)<br>⋯<br>(4) | External output terminal (determination result/ERROR/NC) |

MULTIPLE SENSOR SYSTEM

BACKGROUND OF THE INVENTION

1. Field of the Invention

The present invention relates to a multiple displacement sensor system in which amp units constituting an amp isolated type of displacement sensor, for example are closely provided adjacent to each other through a DIN rail, for example.

2. Description of the Background Art

A displacement sensor is used so as to maintain and improve productivity and quality by helping an apparatus to move on a production line or testing a finishing state of a work. The solution of each problem on the production line by the sensor is called application.

However, in the case of the displacement sensor, since obtained information is only displacement information from the sensor to the work, application which can be implemented is limited. Thus, when time information is provided by moving the work or the sensor or the like, there can be provided data showing various conditions of the work (the number of works, the tilt of a work surface, a size or a configuration of asperity of the work surface, a travel distance of the work and the like). By adding some processing to the displacement data having this time information, the application can be implemented, so that there can be provided more direct information which is required by the user.

As the conventional example, there is a constitution in which a simple application process is performed other than sensing process in the displacement sensor. In this case, a result display or setting of the application process is performed by a sensor body or by a connected PC. In addition, there is also known the conventional example in which firmware of the displacement sensor is rewritable so as to improve the degree of freedom for varying application (refer to Japanese Unexamined Patent Publication No. 2003-99278).

The application of the product line depends on an item of product, a production process, a producer and the like. In addition, since the production line is being improved on a daily basis in various makers, anew application is suddenly generated. If the process is performed by the sensor, modification is needed in a wide range including a part of the sensing process so as to correspond to each application. Therefore, costs for the modification are increased and also a delivery time is increased, so that it cannot correspond to many applications and there is a great risk caused by the modification. Furthermore, a scale of the application process which will be generated in the future is unknown and if ROM capacity or the like is increased in order to correspond to it, costs of the sensor body are increased. As a result, even if the application process itself is not necessary, its costs are increased.

The application process includes counting or tilt measurement or the like, and these are post treatments of data of a displacement meter. Although there are various kinds of displacement meters such as a laser type or a magnetic type, it is preferable that the constitution can be used in all types of displacement meters. However, according to the above conventional example, since it is necessary to develop a new sensor if the sensor is different even when the application is the same, the cost for modification is increased and the delivery time is elongated.

In addition, according to the above conventional example, since the application process is performed while the sensing process is performed, an entire process is delayed.

SUMMARY OF THE INVENTION

The present invention was made in view of the above problems, and it is an object of the present invention to provide a multiple displacement sensor system in which a desired analysis process can be applied to measurement data obtained from an amp unit in chronological order, and an output corresponding to its analyzed result can be generated without incorporating a complicated application program in the amp unit constituting an amp separated type of displacement sensor.

Other objects and operational effects of the present invention are easily understood by those skilled in the art with reference to the following description of this specification.

A multiple displacement sensor system according to the present invention comprises an amp unit row in which one or more amp units constituting an amp isolated type of displacement sensor are adjacently provided, and a transmission line connected to each amp unit constituting the amp unit row and transmitting measurement data generated in each amp unit in one direction. An extension unit is connected to a transmission line similar to the amp unit and provided adjacent to the amp unit positioned at an end on the downstream of the transmission line in the amp unit row.

The extension unit comprises a measurement data accumulation memory in which the measurement data is accumulated, a measurement data acquiring part for acquiring the measurement data coming through the transmission line and accumulating it in the measurement data accumulation memory, a data analyzing part for analyzing the series of measurement data accumulated in the measurement data accumulation memory according to a predetermined algorithm, a determining part for determining a result analyzed by the data analyzing part, and an output part for outputting a control signal corresponding to a result determined by the determining part, to the outside.

According to the above constitution, a desired analysis process can be applied to the measurement data obtained from the amp unit in chronological order and the output corresponding its analysis result can be generated without incorporating a complicated application program in the amp unit which constitutes an amp separated type displacement sensor.

According to a preferred embodiment of the system of the present invention, the measurement data acquiring part automatically starts to acquire the measurement data when a predetermined data acquisition start condition is established and automatically completes accumulation of the measurement data when a predetermined data accumulation finish condition is established. According to this constitution, the measurement data can be appropriately accumulated depending on the data acquisition start condition and the data acquisition finish condition.

According to the preferred embodiment of the system of present invention, the measurement data acquiring part selectively acquires the series of measurement data coming through the transmission line at predetermined intervals from the acquisition start to accumulation finish. According to this constitution, the data corresponding to capacity of the measurement data accumulation memory can be acquired, keeping a data acquisition density required for the analysis.

According to the preferred embodiment of the system of the present invention, an arithmetic process may be sequentially performed, referring to a previous arithmetic process result each time the measurement data is acquired. According to this constitution, since the accumulation process in which the measurement process is performed based on the accumulated measurement data and the sequential process which performs the measurement process sequentially can be used together, a time required for the entire measurement process can be shortened by performing the sequential process during the accumulation process.

According to the preferred embodiment of the system of the present invention, the extension unit can communicate with a high-order apparatus such as a personal computer. According to this constitution, a data process function of the personal computer can be reflected in the control of the extension unit.

According to the preferred embodiment of the system of the present invention, the extension unit comprises a display data accumulation memory in which the measurement data is accumulated as display data, a display data acquiring part for acquiring the measurement data coming through the transmission line and accumulating it in the display data accumulation memory as the display data, and a display data uploading part for uploading the display data accumulated in the display data accumulation memory to the high-order apparatus.

According to the preferred embodiment of the system of the present invention, the display data acquiring part acquires the measurement data at constant intervals which is wider than the intervals at which analysis data is acquired and accumulates it in the display data accumulation memory regardless of a measurement data accumulating period for analysis.

According to the preferred embodiment of the system of the present invention, the extension unit further comprises a download processing part for downloading firmware for implementing each process of acquisition and accumulation, analysis, determination, and output of the measurement data, from the high-order apparatus.

An extension unit according to the present invention is applied to a multiple displacement sensor system comprising an amp unit row in which one or more amp units constituting an amp isolated type of displacement sensor are adjacently provided, and a transmission line connected to each amp unit constituting the amp unit row and transmitting measurement data generated in each amp unit in one direction. This extension unit is connected to the transmission line similar to the amp unit and provided adjacent to the amp unit positioned at the end on the downstream of the transmission line in the amp unit row.

This extension unit comprises a measurement data accumulation memory in which the measurement data is accumulated, a measurement data acquiring part for acquiring measurement data coming through a transmission line and accumulating it in the measurement data accumulation memory, a data analyzing part for analyzing the series of measurement data accumulated in the measurement data accumulation memory according to a predetermined algorithm, a determining part for determining a result analyzed by the data analyzing part, and an output part for outputting a control signal corresponding to a result determined by the determining part, to the outside.

According to the preferred embodiment of the unit of the present invention, the measurement data acquiring part automatically starts to acquire the measurement data when a predetermine data acquisition start condition is established and automatically completes accumulation of the measurement data when a predetermined data accumulation finish condition is established.

According to the preferred embodiment of the unit of the present invention, the measurement data acquiring part selectively acquires the series of measurement data coming through the transmission line at predetermined intervals from the acquisition start to accumulation finish.

According to the preferred embodiment of the system of the present invention, the unit can communicate with a high-order apparatus such as a personal computer.

According to the preferred embodiment of the unit of the present invention, the unit comprises a display data accumulation memory in which the measurement data is accumulated as display data, a display data acquiring part for acquiring the measurement data coming through the transmission line and accumulating it in the display data accumulation memory as the display data, and a display data uploading part for uploading the display data accumulated in the display data accumulation memory to the high-order apparatus.

According to the preferred embodiment of the unit of the present invention, the display data acquiring part acquires the measurement data at constant intervals which is wider than the intervals at which analysis data is acquired and accumulates it in the display data accumulation memory regardless of a measurement data accumulating period for analysis.

According to the preferred embodiment of the unit of the present invention, the extension unit further comprises a download processing part for downloading firmware for implementing each process of acquisition and accumulation, analysis, determination, and output of the measurement data, from the high-order apparatus.

According to another aspect of the present invention, there is provided a displacement sensor comprising the following constitution. This sensor comprises a measurement value acquisition unit for acquiring a displacement measurement value, a measurement value processing unit for processing the displacement measurement value acquired by the measurement acquisition unit, and a process result output unit for outputting a result provided in the measurement value processing unit. Here, the measurement value processing unit processes at least three process categories, that is, waveform shaping, characteristic point extraction, calculation in sequence, each process category can select one or more process programs from the plurality of sectionalized process programs, and process algorithm is determined by designating execution sequence of selected process programs. The "displacement sensor" used here comprises not only the multiple type but also a stand-alone type of displacement sensor and not only the amp separated type but also an amp integrated type of displacement sensor.

According to the preferred embodiment, the measurement value processing unit may process each process category of trigger control, waveform shaping, characteristic point extraction, calculation, determination and external setting output in sequence.

According to the preferred embodiment, the measurement value processing unit may comprise a storing part for storing one or more process programs in which measurement algorithm is sectionalized, together with its identification information and execution address by measurement stage in which execution sequence is predetermined, an input part for inputting the identification information and the execution sequence of the process program to be executed by measurement stage, a table creating part for creating a measurement process table comprising the execution sequence input by the input part and the execution address read from the storing part, and a measurement stage based program executing part for reading and executing the one or more process programs by measurement stage, based on the measurement process table.

According to another aspect of the present invention, there can be provided a multiple display sensor system having the following constitution. The multiple displacement sensor system comprises an amp unit row in which one or more amp units constituting an amp isolated type of displacement sensor are adjacently provided, and a transmission line connected to each amp unit constituting the amp unit row and transmitting measurement data generated in each amp unit in one direction, and an extension unit is connected to a transmission line similar to the amp unit and provided adjacent to the amp unit positioned at an end on the downstream of the transmission line in the amp unit row. The extension unit comprises a measurement value acquisition unit for acquiring a displacement measurement value, a measurement value processing unit for processing the displacement measurement value acquired by the measurement value acquisition unit, and a process result output unit for outputting a result provided in the measurement value processing unit.

The measurement value processing unit processes at least three process categories, that is, waveform shaping, characteristic point extraction, calculation in sequence, each process category can select one or more process programs from the plurality of sectionalized process programs, and process algorithm is determined by designating execution sequence of the selected process programs.

According to another aspect of the present invention, there can be provided an extension unit having the following constitution. This extension sensor is applied to a multiple displacement sensor system comprising an amp unit row in which one or more amp units constituting an amp isolated type of displacement sensor are adjacently provided, and a transmission line connected to each amp unit constituting the amp unit row and transmitting measurement data generated in each amp unit in one direction, and connected to and provided adjacent to the amp unit positioned at an end on the downstream of the transmission line in the amp unit row, similar to the amp unit. This extension unit comprises a measurement value acquisition unit for acquiring a displacement measurement value, a measurement value processing unit for processing the displacement measurement value acquired by the measurement value acquisition unit, and a process result output unit for outputting a result provided in the measurement value processing unit. The measurement value processing unit processes at least three process categories, that is, waveform shaping, characteristic point extraction, calculation in sequence, each process category can select one or more process programs from the plurality of sectionalized process programs and the process algorithm is determined by designating execution sequence of the selected process programs.

According to another aspect of the present invention, there can be provided a displacement sensor having the following constitution. This displacement sensor comprises a measurement value acquisition unit for acquiring a displacement measurement value, a measurement value processing unit for processing the displacement measurement value acquired by the measurement value acquisition unit, a process result output unit for outputting a result provided in the measurement value processing unit, and a high-order apparatus such as a personal computer which is connected to the displacement sensor through communication. The high-order apparatus comprises a display unit and a process program set unit. The process program set unit performs a display process in which information necessary for setting the process program is displayed on the display unit. The display process comprises a process for displaying at least three processes such as waveform shaping, characteristic point extraction and calculation in process categories in this order, a process for displaying a process program number list in which the process programs can be registered in process execution sequence in each process category, and a process for displaying a process program option list for each process category. The measurement value processing unit of the displacement sensor performs measurement value processes registered in the process program number list in sequence of the list, and in sequence of the process program numbers in each process category.

According to the preferred embodiment, a displacement sensor may comprise a storing part for storing one or more process programs in which measurement algorithm is sectionalized together with their identification information and execution addresses by measurement stage in which execution sequence is predetermined, an input part for inputting the identification information and the execution sequence of the process programs to be executed by measurement stage, a table creating part for creating a measurement process table comprising the execution sequence input by the input part and the execution addresses read by the storing part, and a measurement stage based program executing part for reading and executing one or more process programs by measurement stage based on the measurement process table.

According to a preferred embodiment of an extension unit of a multiple displacement sensor system of the present invention, it comprises a storing part for storing one or more process programs in which measurement algorithm is sectionalized together with their identification information and execution addresses by measurement stage in which execution sequence is predetermined, an input part for inputting the identification information and the execution sequence of the process programs to be executed each measurement stage, a table creating part for creating a measurement process table comprising the execution sequence input by the input part and the execution addresses read by the storing part, and a measurement stage based program executing part for reading and executing one or more process programs by measurement stage based on the measurement process table.

According to this constitution, when the identification information and the execution sequence of the process program to be executed are input, the process program to be executed is selected from the process programs stored in the storing part and performed by measurement stage. Since one or more process programs are stored by measurement stage, the degree of freedom for selecting the process program by measurement stage, so that the desired measurement algorithm can be freely constituted.

According to a preferred embodiment, the input part may be able to receive communication from a high-order apparatus such as a personal computer. According to such a constitution, the identification information and the execution sequence of the process programs to be executed by measurement stage can be input easily.

According to the preferred embodiment, the process program may be constituted such that a predetermined parameter can be set. In this constitution, the measurement algorithm can be diversified. In addition, since only the parameter of the process program can be changed, the measurement can become close to the measurement desired by the user without changing the measurement algorithm.

According to the preferred embodiment, the high-order apparatus may be provided with a first setting system in which programs to be executed by measurement stage can be registered or deleted, and the setup parameter of the program can be changed, and a second setting system in which the setup parameter of the program can be changed.

In this constitution, the first setting system can be in an administration mode for a skilled person and the second setting system can be in a user mode for a beginner. Thus, since the process program cannot be selected in the user mode for the beginner, it is prevented that the beginner user changes the measurement algorithm by mistake and cannot restore it.

According to the preferred embodiment, it may further comprise a rewritable storing part for storing identification information of the process program received from the high-order apparatus and its execution sequence. In this constitution, various kinds of measurement algorithm can be stored. In this case, since the identification information of the process program and its execution sequence received from the high-order apparatus are only changed without rewriting the contents of the process program itself, a time required for changing can be shortened.

According to the preferred embodiment of the system of the present invention, predetermined measurement algorithm may be stored in the rewritable storing part. In this constitution, even the beginner user can perform desired measurement easily. In addition, new measurement algorithm can be constituted by changing the previously stored measurement algorithm.

According to the preferred embodiment, measurement stages comprise a first step of defining start and finish of a measurement process according to a signal from the outside or a self-trigger, a second step of removing a noise from waveform data output from a detection end, a third step of extracting a characteristic point from a shaped waveform, and a fourth step of performing a predetermined calculation based on the extracted characteristic point. In this constitution, since the data desired by the user can be taken out of the waveform data output from the detection end, it is easy to be used.

According to another aspect of the present invention, there is provided a multiple sensor system having the following constitution. The multiple sensor system comprises an amp unit row in which one or more amp units constituting an amp isolated type of displacement sensor are adjacently provided, and a transmission line connected to each amp unit constituting the amp unit row and transmitting measurement data generated in each amp unit in one direction, and an extension unit is connected to a transmission line similar to the amp unit and provided adjacent to the amp unit positioned at an end on the downstream of the transmission line in the amp unit row. The extension unit may comprise a storing part for storing one or more process programs in which measurement algorithm is sectionalized together with their identification information and execution addresses by measurement stage in which execution sequence is predetermined, an input part for inputting the identification information and the execution sequence of the process programs to be executed by measurement stage, a table creating part for creating a measurement process table comprising the execution sequence input by the input part and the execution addresses read by the storing part, and a measurement stage based program executing part for reading and executing one or more process programs by measurement stage based on the measurement process table.

As can be clear from the above description, according to the present invention, since the measurement data accumulation memory is provided in the extension unit, when this is provided adjacent to an end of the series of amp units and connected to the existing transmission line and then each unit is operated, measurement data generated in each amp unit is sequentially accumulated in the measurement data accumulation memory in the extension unit at predetermined timing and then the predetermined analysis and determination processes are performed based on the series of measurement data stored in the memory. As a result, unlike the conventional displacement sensor system, the information of the measurement object can be obtained with high precision by performing desired arithmetic process on the series of measurement data including time information. Furthermore, since the functions of data acquisition, data analysis, data determination are provided in the extension unit and it is not necessary to incorporate a special memory or a high-performance program in the amp unit, highly functioning measurement can be implemented by using the general-purpose amp unit and the extension unit together.

BRIEF DESCRIPTION OF THE DRAWINGS

FIG. 10 shows a view showing a hardware constitution of an entire sensor system;

FIGS. 13A and 13B show flowcharts schematically showing processes of the amp unit.

FIGS. 14A, 14B and 14C show flowcharts schematically showing processes of the extension unit.

FIGS. 17A, 17B and 17C show views explaining data accumulation timing.

FIGS. 19A and 19B show views showing a concrete example of an application.

FIGS. 20A, 20B, 20C and 20D show timing charts explaining data acquisition and analysis operations.

FIG. 23 shows a view explaining a registering method of the process program.

DESCRIPTION OF THE PREFERRED EMBODIMENTS

One preferred embodiment of the present invention will be described in detail with reference to the accompanying drawings hereinafter.

Figure 1:
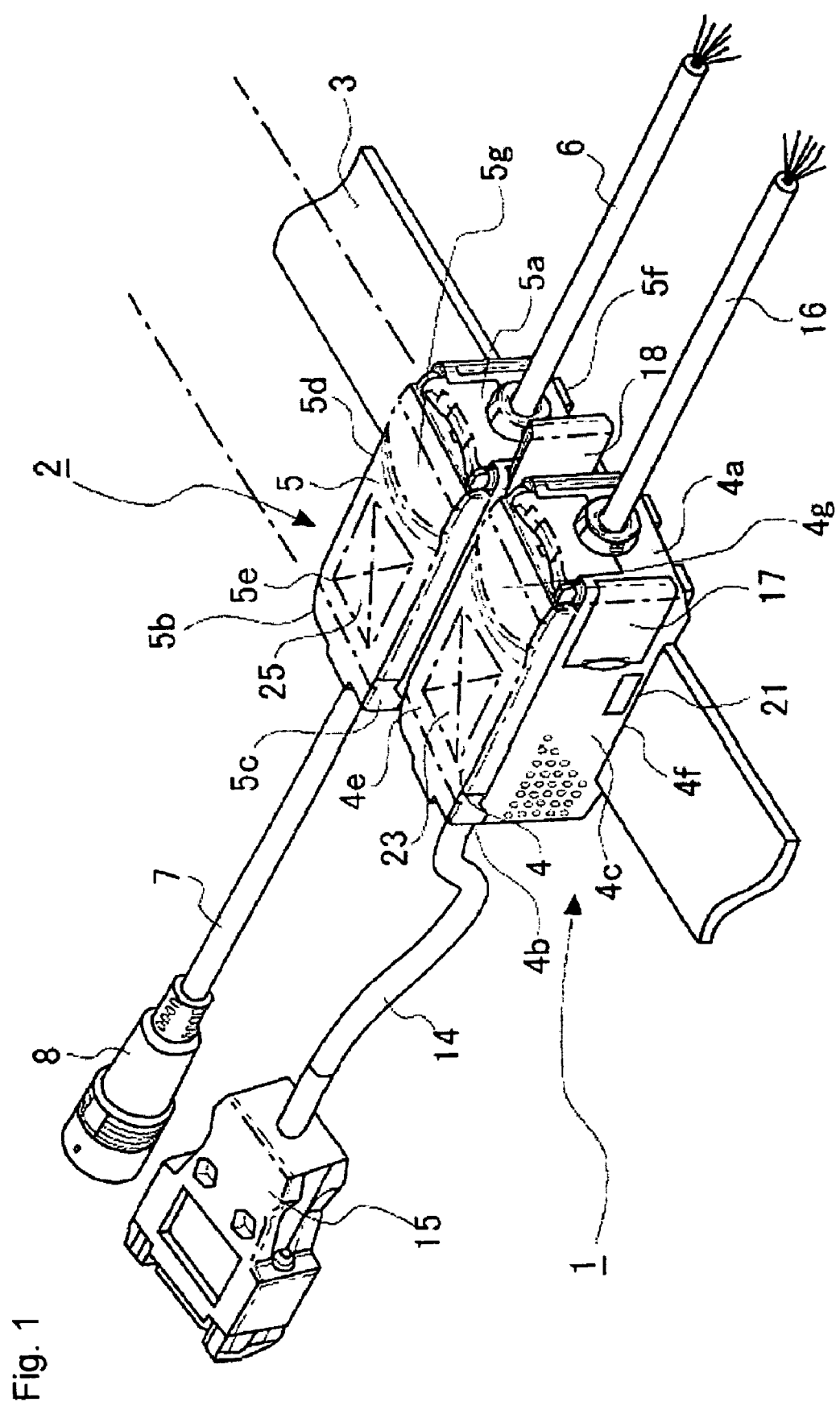
FIG. 1 shows a perspective view showing an adjacent connected state between an extension unit (provided with an external input/output line and an RS232C cable) and an amp unit.

FIG. 1 is a perspective view showing an adjacently connected state between an extension unit 1 and one or more amp units 2 to which the present invention is applied. As shown in FIG. 1, the extension unit 1 and the amp unit 2 are adjacently connected in a row through a DIN rail 3 in this example.

According to this embodiment, a case 4 of the extension unit 1 and a case 5 of the amp unit 2 have the same standard. The cases 4 and 5 have rectangular-solid shape slightly elongated in the direction perpendicular to the DIN rail 3. That is, the case 4 of the extension unit 1 has a front face 4a, a back face 4b, a left side face 4c, a right side face 4d, an upper face 4e, and a bottom face 4f, which forms a box-shaped hexahedron.

Similarly, the case 5 of the amp unit 2 has a front face 5a, a back face 5b, a left side face 5c, a right side face 5d, an upper face 5e, and a bottom face 5f, which forms a hexahedron.

A first electric code 6 is withdrawn from the front face 5a of the amp unit 2. The first electric code 6 comprises an external input line, an external output line, a power supply line and the like. Through the external input line, various kinds of commands are given from a PLC or the like to the amp unit 2, for example. Through the external output line, a switching output or an analog output generated inside the amp unit 2 is output to the external PLC or the like, for example. Through the power supply line, a power is supplied to an internal circuit of the amp unit 2.

A second electric code 7 withdrawn from the back face 5b of the amp unit 2 comprises various kinds of signal lines through which signals are communicated with a sensor head unit 9 (refer to FIG. 2) as described below. These signal lines contain a received light intensity signal generated in the sensor head unit 9 and the like. A circular connector 8 is mounted on an end of the second electric code 7. The circular connector 8 is connected to a similar circular connector 13 mounted on an end of an electric code withdrawn from the sensor head 9 (not shown).

Figure 2:
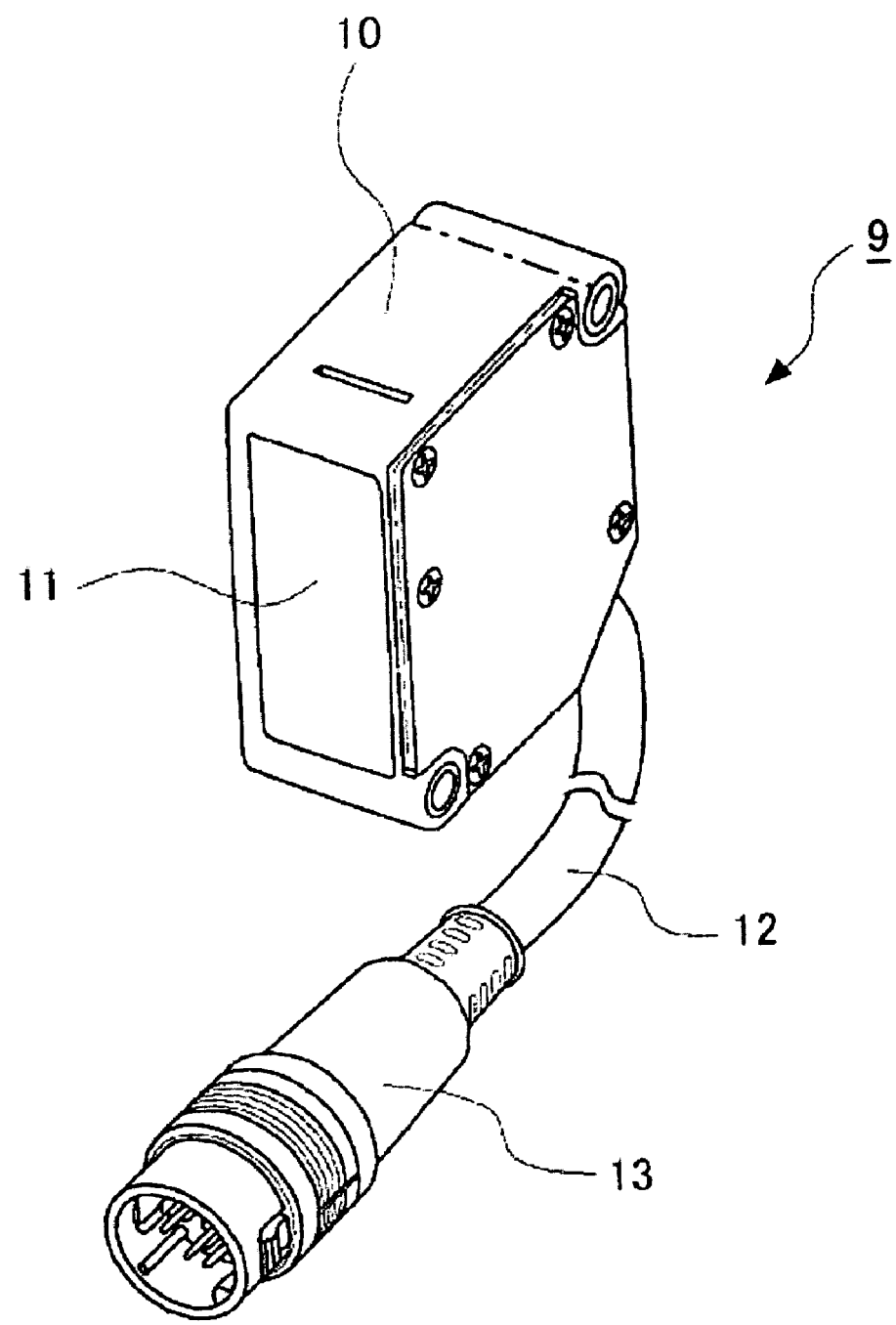
FIG. 2 shows a perspective view showing a sensor head unit for a displacement sensor.
Figure 3:
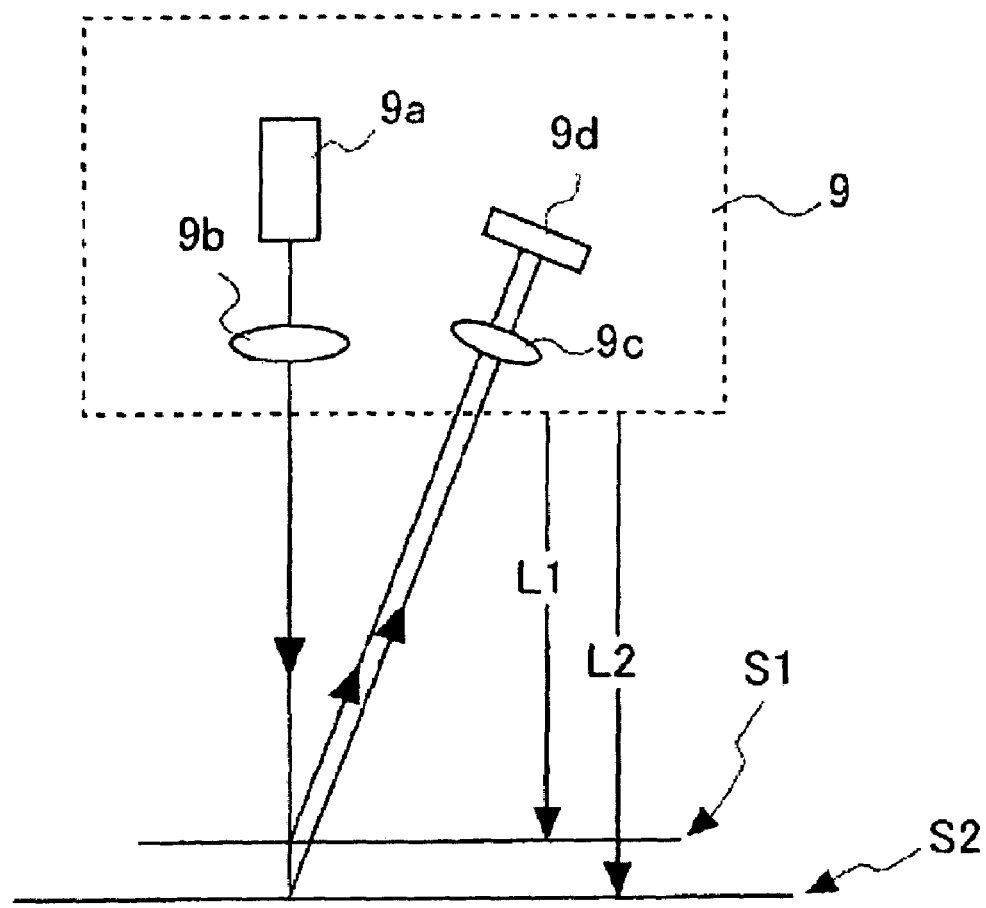
FIG. 3 shows a view explaining a measurement principle of a displacement sensor.

FIG. 2 shows a perspective view showing a sensor head unit for a displacement sensor. The sensor head unit 9 shown in FIG. 2 has a rectangular-solid shaped case 10. A light projecting/receiving window 11 is provided on the side of a front face of the case 10 and an electric code 12 is withdrawn from a back face, and the circular connecter 13 is mounted on its end. Thus, the circular connector 13 is connected to the circular connector 8. According to this amp separated type of photoelectric sensor, the amp unit 2 and the sensor head unit 9 can be separated if necessary by detaching the circular connector 8 from the circular connector 13. In addition, as is well known to those skilled in the art, as shown in FIG. 3, the sensor head unit 9 incorporates a light source 9a, a light-projecting optical system 9b, a light-receiving optical system 9c, a position sensitive device (PSD) 9d, circuits (not shown) for projecting and receiving light and the like. Thus, an input signal to the light projecting circuit or an output signal from the light receiving circuit and the like flow in the electrical code 12.

Referring to FIG. 1 again, a third electric code 14 is withdrawn from the back face 4b of the extension unit 1 and an RS-232C connector 15 which is connected to a corresponding connector of a personal computer is mounted on an end of the third electric code 14. The third electric code 14 comprises a communication line for communicating between the extension unit 1 and the personal computer PC.

A fourth electric line 16 is withdrawn from the front face 4a of the extension unit 1. The fourth electric code 16 comprises an external input line, an external output line, a power supply line and the like. Through the external input line, various kinds of commands are given from the external PLC and the like to the extension unit 1. Through the external output line, various kinds of signals (which will be described in detail below) generated inside the extension unit are output to the external PLC and the like. Through the power supply line, a power is supplied to an internal circuit of the extension unit 1.

In addition, as can be clear from the figure, a size of the case 4 of the extension unit 1 is designed so as to be sufficiently smaller than a size of the RS-232c connector 15.

A transparent cover 4g which can be opened and closed is provided on the upper face of the extension unit 1. In addition, a manipulation and display unit 23 for performing various kinds of command manipulations and displaying operations in the extension unit 1 is provided under the transparent cover 4g.

A transparent cover 5g which can be opened and closed is provided on the upper face of the amp unit 2 also. In addition, a manipulation and display unit 25 for performing various kinds of command manipulations and displaying operations in the amp unit 2 is provided under the transparent cover 5g.

As can be seen from FIGS. 1 to 6, although the case 4 of the extension unit 1 is constituted so as to be relatively small, the upper face 4e which is opposed to a user in a state that the DIN rail is mounted is effectively used so that the manipulation and display unit 23 is disposed there. The manipulation and display unit 23 can be disposed in such a manner because the RS-232C connector is not forced to be incorporated in the case 4 and the RS-232C connector 15 is mounted on the end of the third electric code 14 withdrawn from the case 4. In this constitution, even when unreasonable force is applied to the RS-232C connector 15, since such force is interfered with the third electric code 14, the body case 4 is not damaged. Meanwhile, if the RS-232C connector 15 is fixed in the case 4 of the extension unit 1, when the connector is to be separated, unreasonable force is applied to the case 4. As a result, the case could be damaged or a connection defect of the connector could occur.

Figure 4:
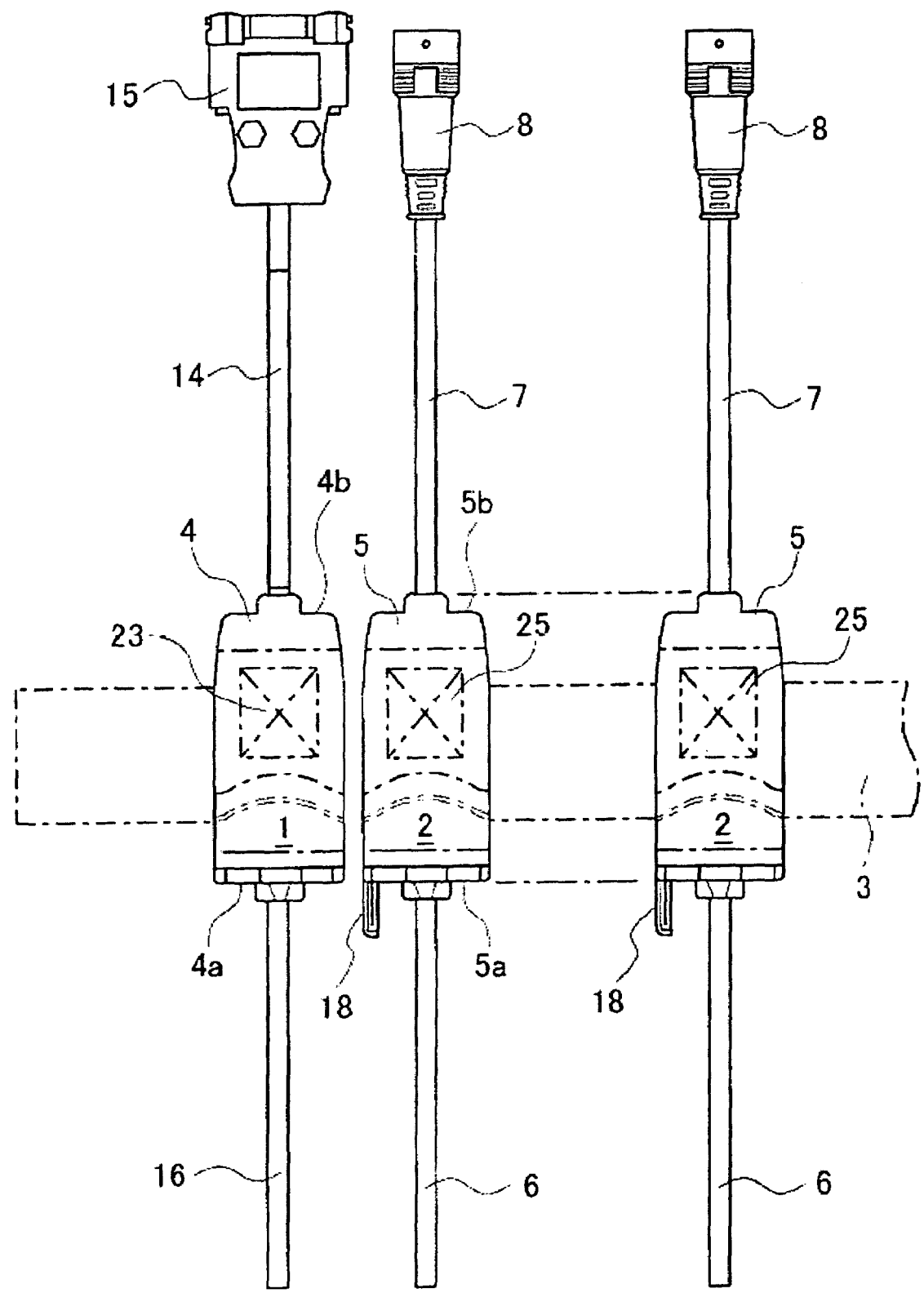
FIG. 4 shows a plan view showing an adjacent connected state between the extension unit (provided with the external input/output line and the RS232C cable) and the amp unit.
Figure 5:
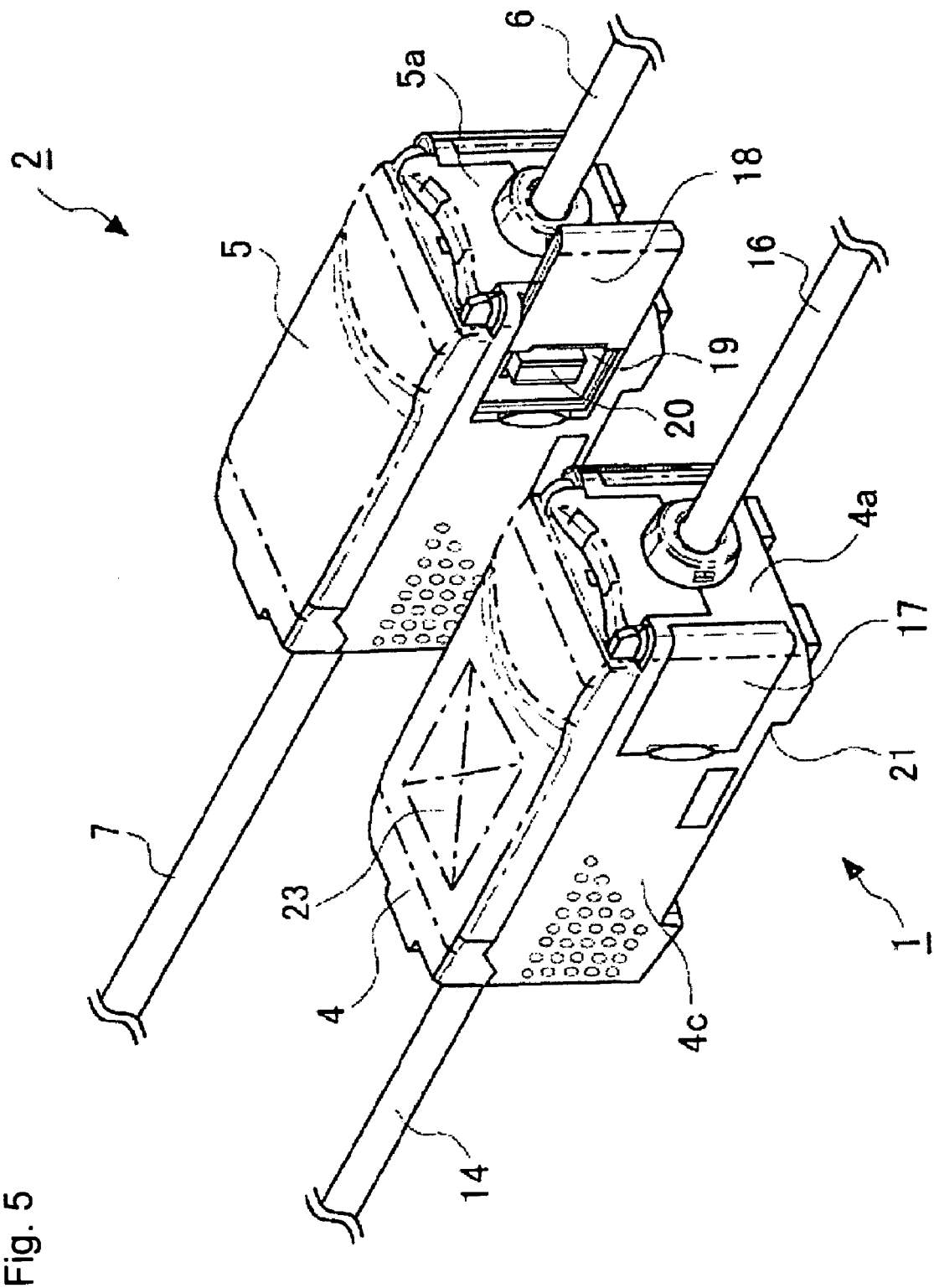
FIG. 5 shows a perspective view showing an isolated state between an extension unit (provided with an external input/output line) and an amp unit.
Figure 6A:
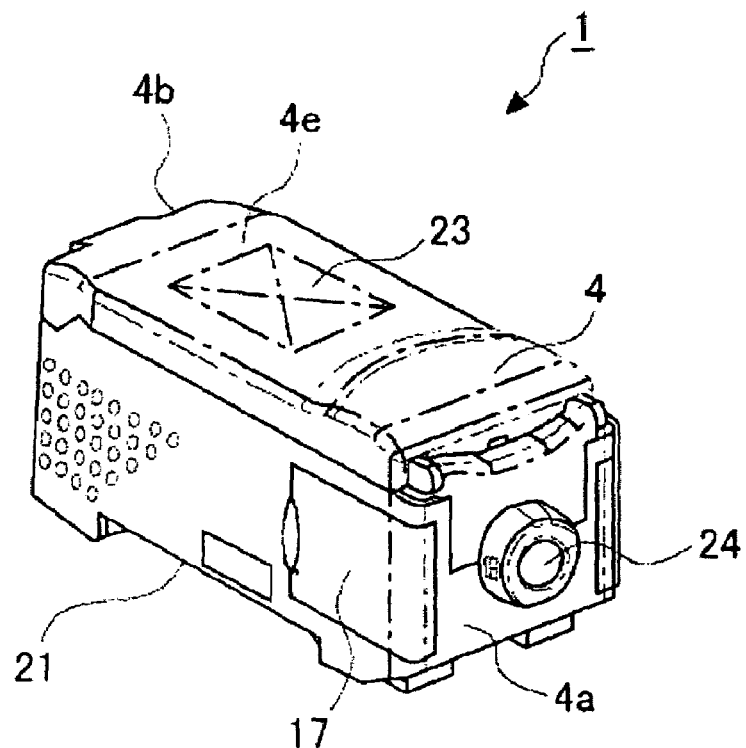
FIGS. 6A and 6B show views explaining the extension unit.
Figure 6B:
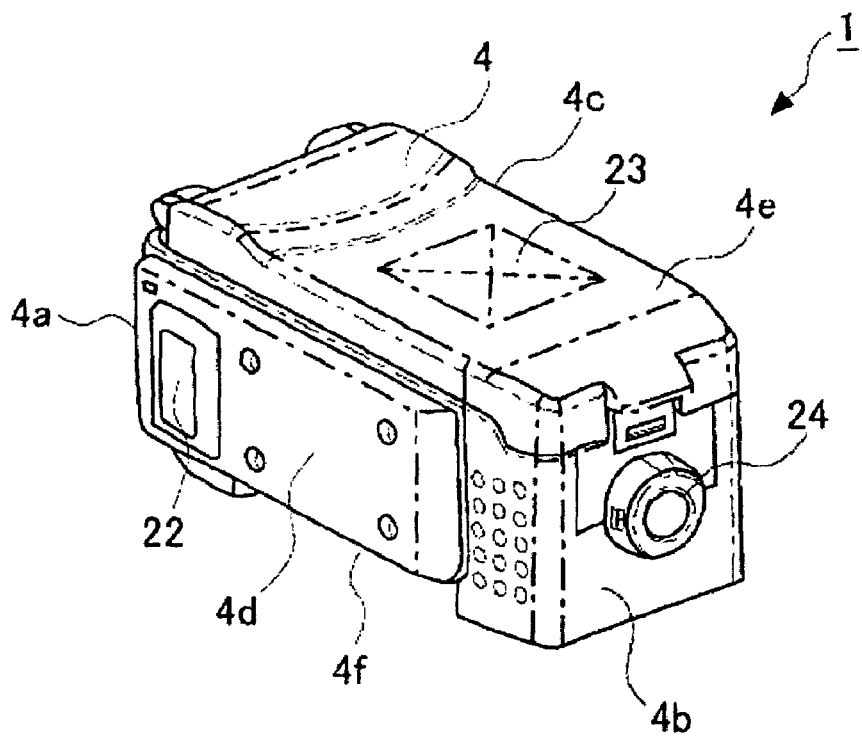

As shown in FIGS. 4 to 6, slides lids 17 and 18 are provided on both right and left side faces of the case 4 of the extension unit 1 and the case 5 of the amp unit 2, respectively. When each of the slide lids 17 and 18 is opened, a connector window 19 is viewed inside and an adjacently connecting connector 20 is exposed in the window. Therefore, the extension unit 1 and the amp unit 2 are electrically and mechanically connected to each other by engaging the adjacent connectors 20 and 22 which are exposed on the opposite side faces to each other. In addition, as shown in FIG. 4, it is needless to say that the entire units 1 and 2 are fixed through the DIN rail 3. Furthermore, the adjacently connecting connectors 20 and 22 include both first transmission line (BB) and second transmission lines (BS0 and BS1) as will be described below.

FIG. 4 is a plan view showing an adjacently connected state between the extension unit 1 and the amp unit 2. As seen in FIG. 4, when the units 1 and 2 are adjacently connected, the third electric code 14 withdrawn from the back face 4b of the extension unit 1 and the electric code 7 withdrawn from the back face 5b of the amp unit 2 are withdrawn in the same direction as a result. Meanwhile, the first electric code 6 withdrawn from the front face 5a of the amp unit 2 and the fourth electric code 16 withdrawn from the front face 4a of the extension unit 1 extend in the direction perpendicular to the DIN rail 3 and in the direction opposite to the electric codes 7 and 14 as a result. Therefore, even when the units 1 and 2 are mounted on a face of a control board and the like through the DIN rail 3, the electric codes 6, 7, 14 and 16 are functionally aligned and withdrawn. As a result, they can be easily handled and when many units are arranged in parallel, its connection work becomes easy. In addition, referring to FIGS. 1 to 6, a reference numeral 21 designates a DIN rail fit-in groove for being connected to the DIN rail 3.

Figure 7:
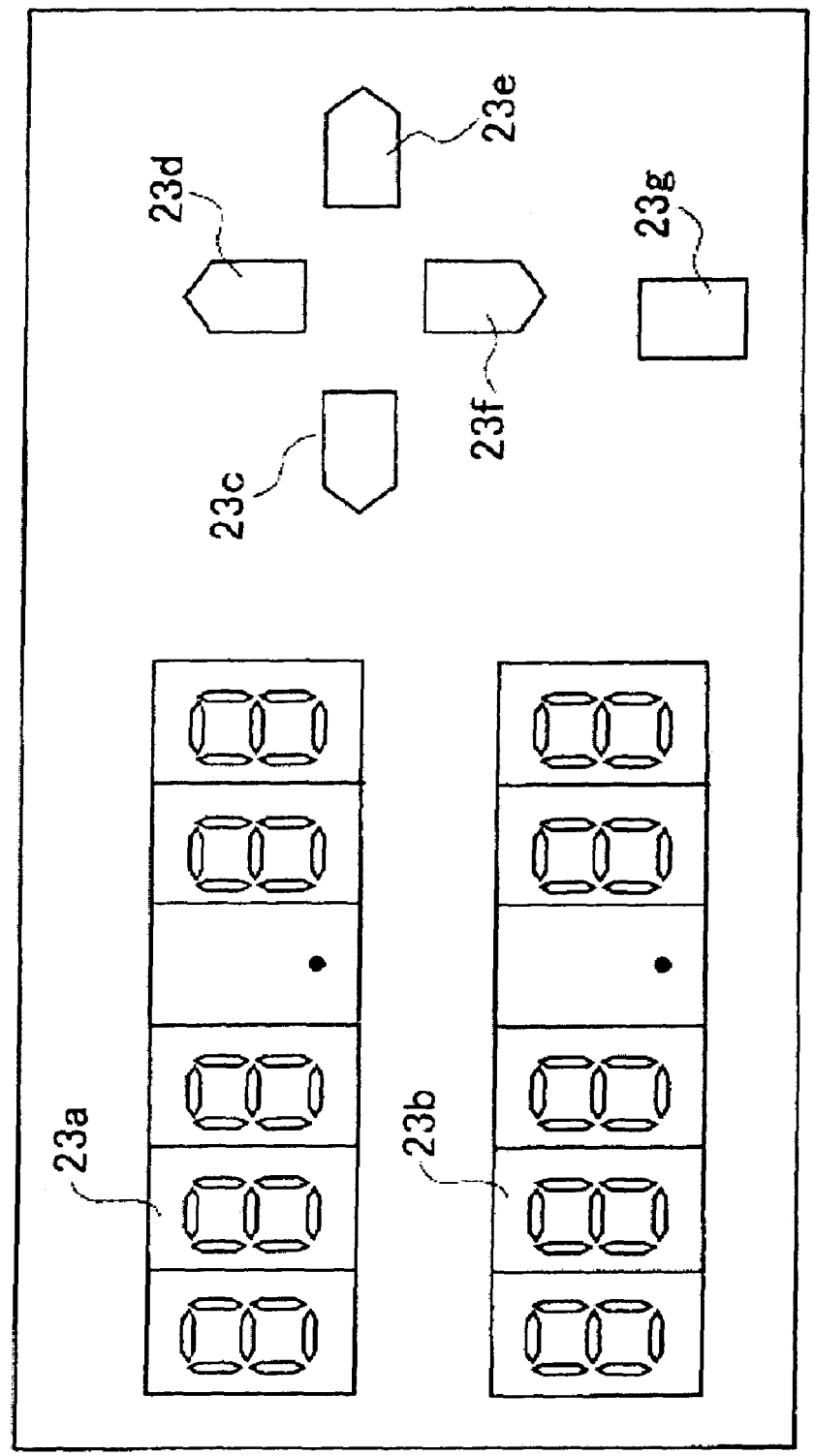
FIG. 7 shows a constitutional view showing a manipulation and display unit of the extension unit.

FIG. 7 is a constitutional view showing one example of the manipulation and display unit 23 of the extension unit 1. As shown in FIG. 7, the manipulation and display unit 23 comprises a first 7-segment display 23a, a second 7-segment display 23b, 4-direction shift keys comprising a left-direction key 23c, an upper-direction key 23d, a right-direction key 23e, and a lower-direction key 23f, and one push-button key 23g. An analysis process or setting data as will be described below can be selected, or various kinds of manipulation commands can be given by appropriately manipulating those keys 23c to 23g and displaying various data in the first and second 7-segmment displays 23a and 23b.

Figure 8:
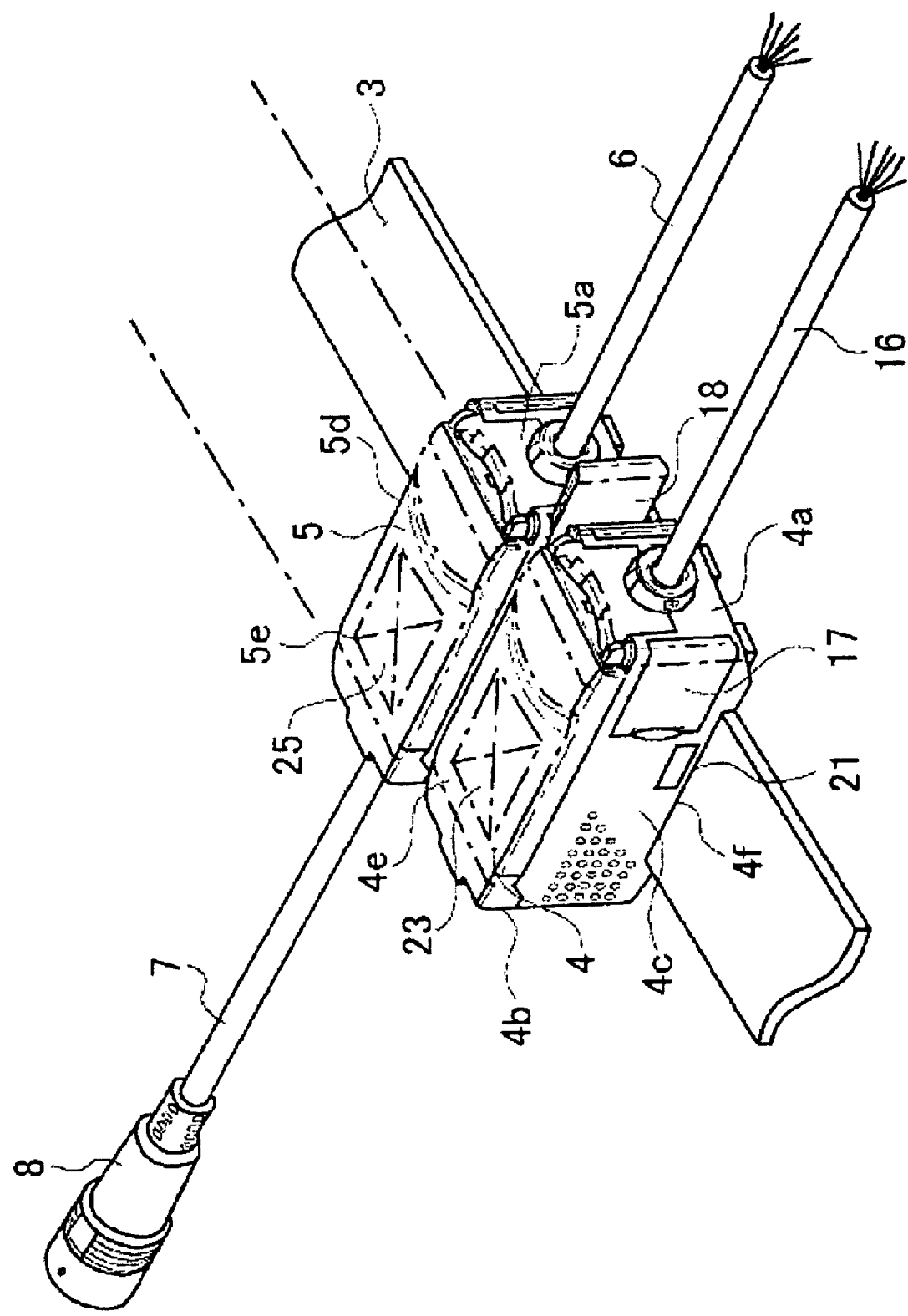
FIG. 8 shows a perspective view showing an adjacent connected state between the extension unit (provided with the external input/output line) and the amp unit.
Figure 9:
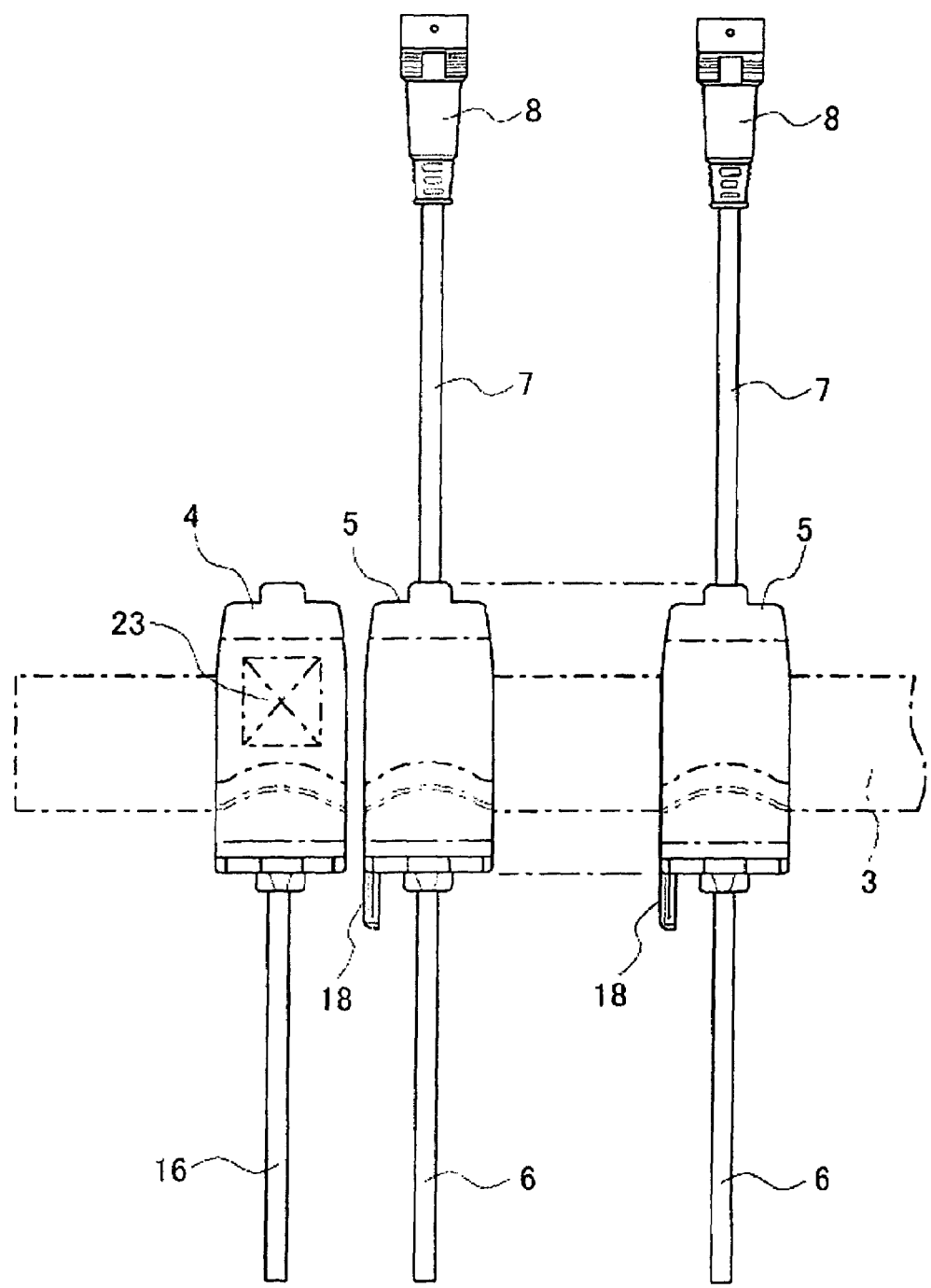
FIG. 9 shows a plan view showing an adjacent connected state between the extension unit (provided with the external input/output line) and the amp unit.

The structure of the extension unit 1 and the amp unit 2 described with reference to FIGS. 1 to 7 in the above is only one example of the present invention. Although the structure described above is especially premised on connection through communication between the extension unit 1 and the personal computer, the constitution according to the present invention does not necessarily need the personal computer. In this case, as shown in FIGS. 8 and 9, the RS-232C connector 15 and the third electric code 14 do not exist.

Figure 10:
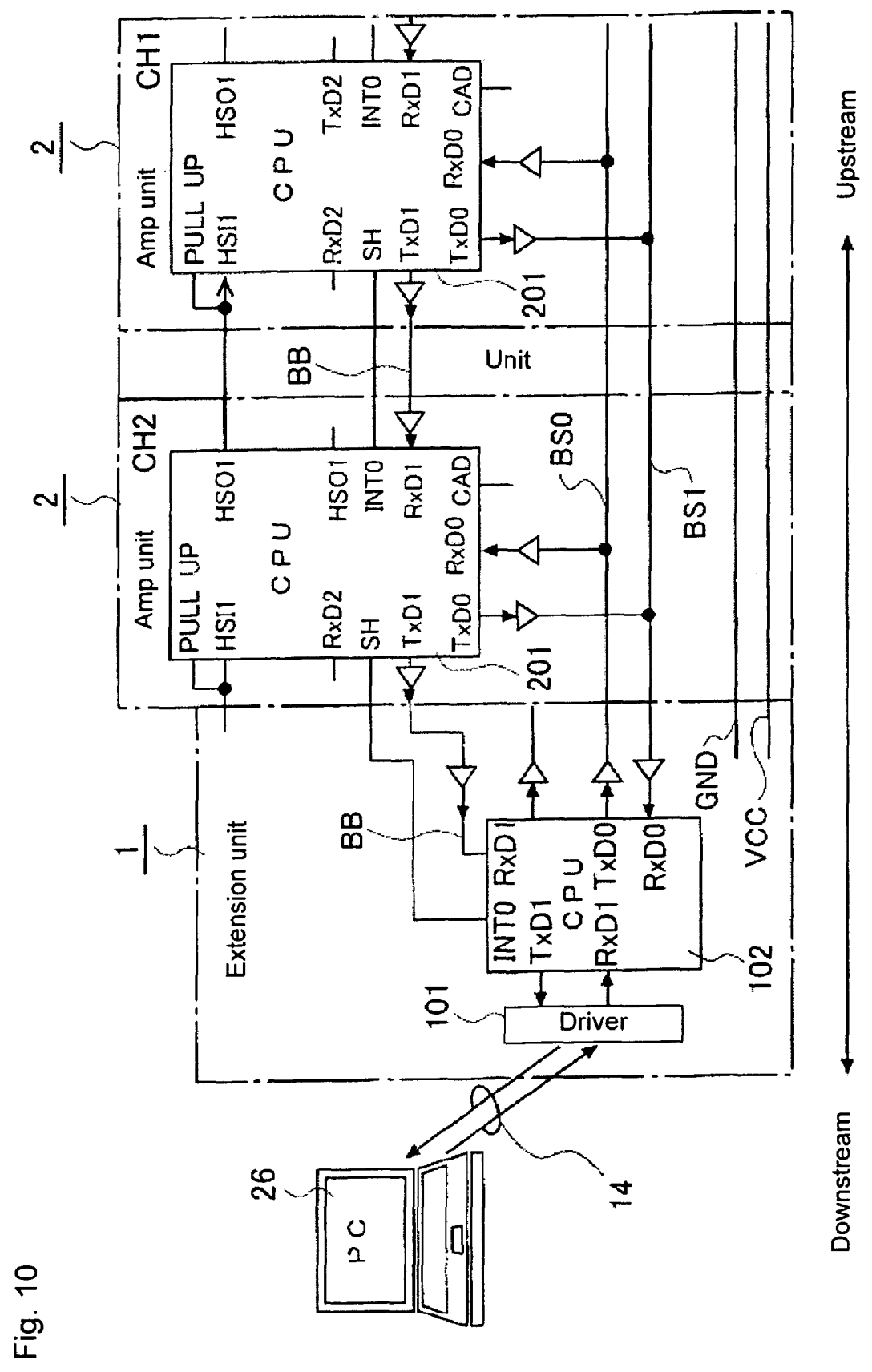

Next, with reference to FIGS. 10, 11 and 12, an electrical hardware constitution of the extension unit 1 and the amp unit 2 will be described. FIG. 10 shows a hardware constitutional diagram of the entire sensor system. As shown in FIG. 10, the sensor system comprises a notebook-size personal computer 26, for example, one extension unit land two amp units 2 sequentially connected to the extension unit 1.

The personal computer 26 and the extension unit 1 are connected through the connectors 13 and 15 and the electric codes 12 and 14 (refer to FIGS. 1 and 2).

The extension unit 1 comprises a driver IC101 and a CPU 102 and an EEPROM 108 (first memory part). The driver IC101 supports RS-232C communication. The CPU 102 comprises a program memory which stores firmware which defines a function of the extension unit 1 and a microprocessor which carries out the firmware in the program memory, although they are not shown. In addition, the CPU 102 comprises a measurement data accumulation memory 102a (refer to FIG. 11). In the memory 102a, measurement data sent from the amp unit is stored according to predetermined procedures as will be described below.

Figure 11:
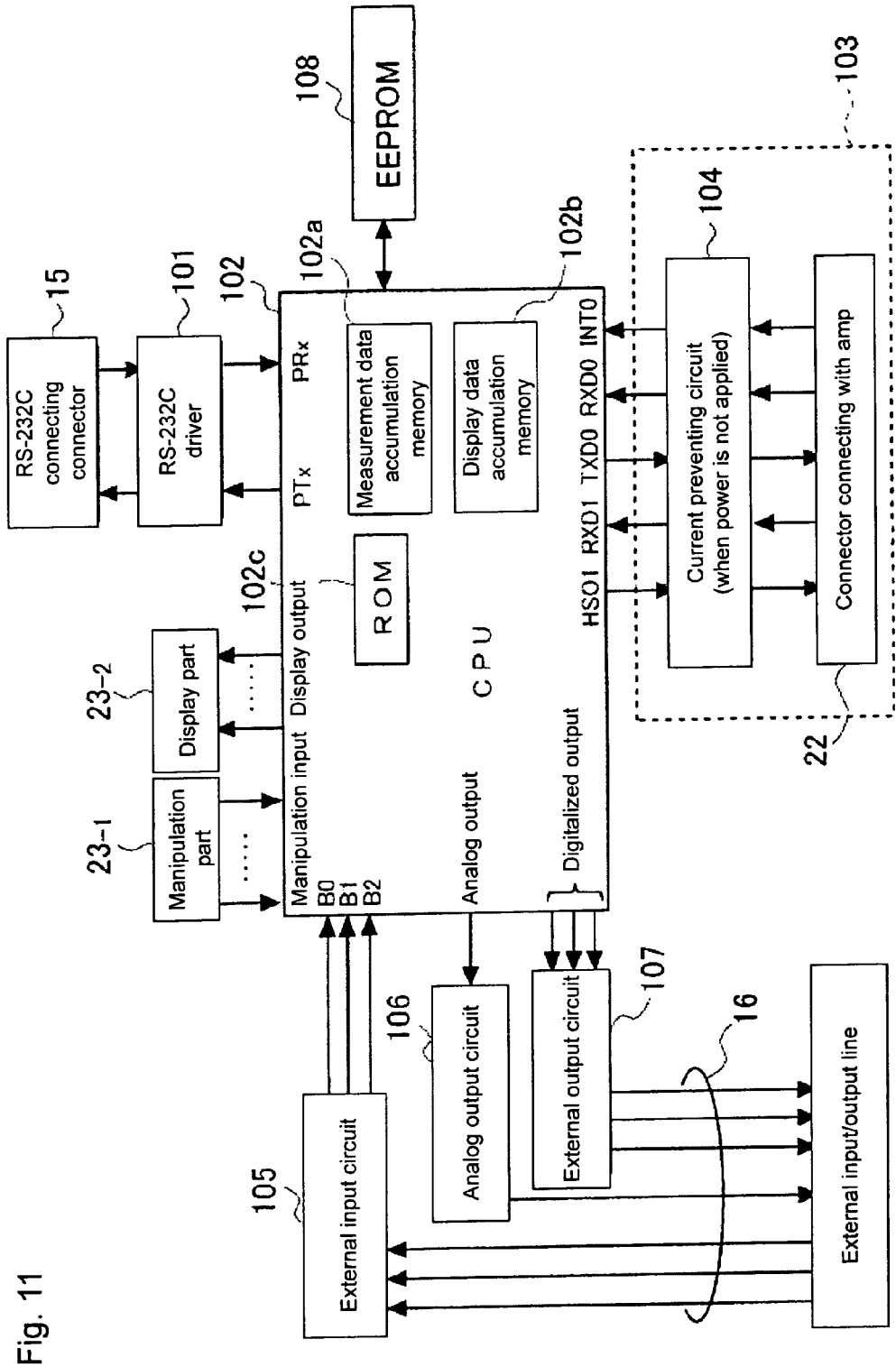
FIG. 11 shows a block diagram showing a hardware constitution of the extension unit.

FIG. 11 is a circuit block diagram showing an internal constitution of the extension unit 1 in detail. As shown in FIG. 11, the extension unit 1 comprises the CPU 102, a circuit board 103 on the amp unit side, a RS-232C driver 101 for implementing communication with the personal computer, a manipulation part 23-1 and a display part 23-2 which constitute the manipulation and display unit 23. In addition, the circuit board 103 on the amp side comprises a connector (right side) 22 to the amp, and a current preventing circuit (when a power is not applied) 104. An external input circuit 105 is used for inputting various kinds of commands coming from the PLC or the like to the CPU 102 through an external input/output line. An analog output circuit 106 outputs various kinds of analog outputs generated in the extension unit 1 to the outside through the external input/output line. An external output circuit 107 outputs various kinds of signals generated in the extension unit to the external input/output line connected to the PLC and the like.

Referring to FIG. 10 again, an internal constitution of the amp unit 2 will be described. Each amp unit 2 comprises a CPU 201 comprising a program memory which stores firmware which defines a function of the amp unit and a microprocessor which carries out the firmware in the program memory. The CPU 201 in each amp unit 2 is connected to the extension unit 1 through two serial bus lines BS0 and BS1 whose transmission directions are different. In addition, the CPU 102 in the extension unit 1 and the CPU 201 in the amp unit 2 are sequentially connected by a serial transmission line BB which serially transfers data in a bucket brigade method.

While the serial bus lines BS0 and BS1 are mainly used for transmitting or receiving commands or program data, the transmission line BB which transmits data by the bucket brigade method is used for sending measurement data generated in the amp unit 2 to the extension unit 1 in an effluent manner. In addition, when the data is transferred using the transmission line BB, a handshake process is used together.

Figure 12:
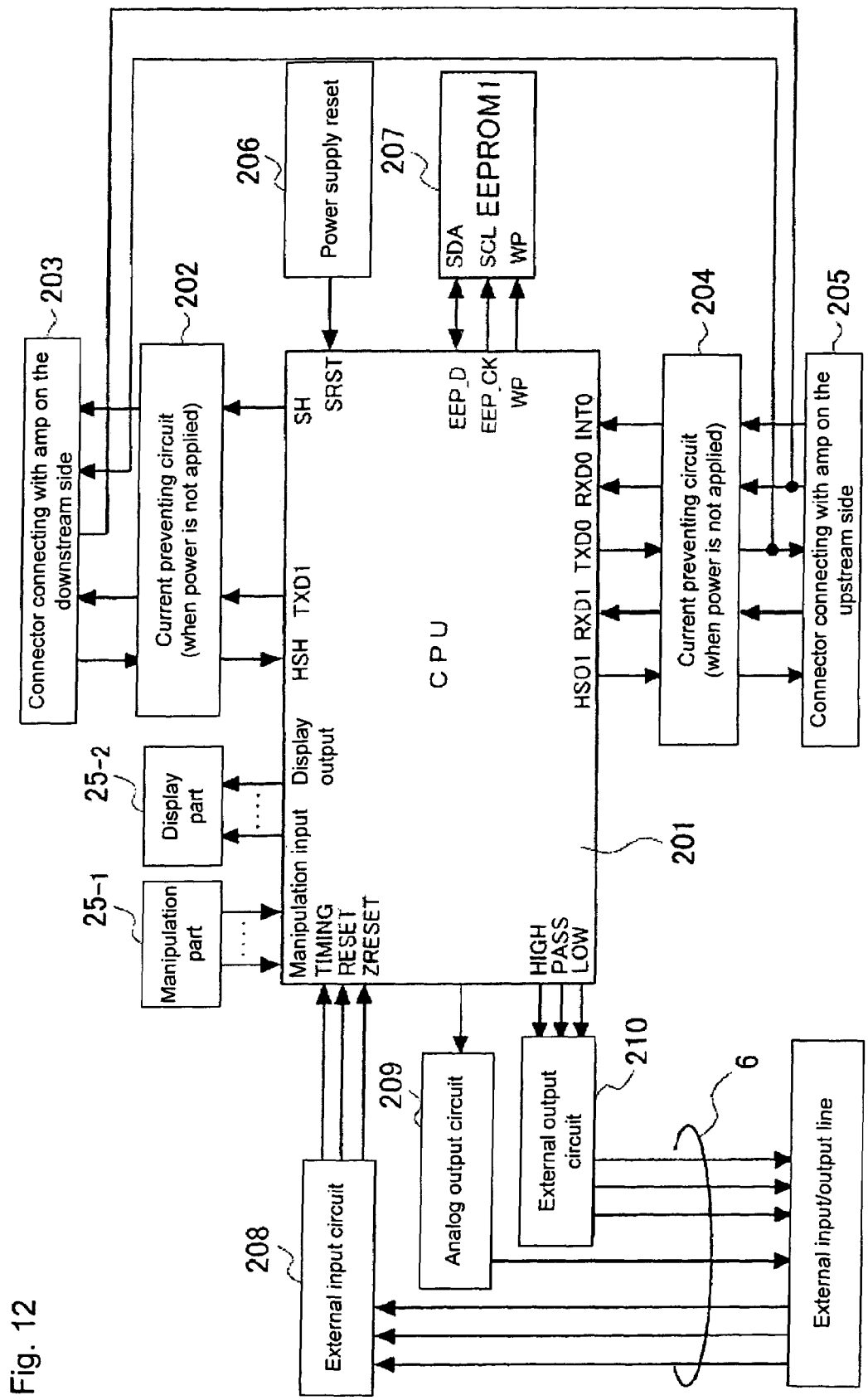
FIG. 12 shows a block diagram showing a hardware constitution of the amp unit.

FIG. 12 is a block diagram showing the constitution of the internal circuit of the amp unit 2 in detail. As shown in FIG. 12, the amp unit 2 comprises the CPU 201, a current preventing circuit 202 (when the power is not applied), a connector 203 connecting with the amp (on the downstream side), a current preventing circuit 204 (when the power is not applied), a connector 205 connecting with the amp (on the upstream side), a power supply reset circuit 206, an EEPROM 207, an external input circuit 208, an analog output circuit 209 and an external output circuit 210.

As described above, the CPU 201 comprises the program memory which stores the firmware which defines the function of the amp unit and the microprocessor which carries out the firmware in the program memory although they are not shown. The analog output circuit 209 outputs various kinds of analog outputs generated in the amp unit 2 to the outside through the external input/output line. The external output circuit 210 outputs a determination output such as HIGH, PASS, or LOW generated in the amp unit to the external input/output line. The external input circuit 208 is used for inputting various kinds of commands coming through the external input/output line, to the CPU 201.

Next, a description will be given of software constitutions of the extension unit 1 and the amp unit 2.

FIG. 13 is a flowchart showing processes of the amp unit schematically. The processes of the amp unit comprises normal processes shown in FIG. 13A and SH-reception interrupt processes shown in FIG. 13B.

According to the normal processes, as shown in FIG. 13A, a connection process is performed immediately after the power supply is turned on at step 1301. This connection process is well known to those skilled in the art in this kind of multiple sensor units. That is, a unique address is allotted to each of amp units constituting an amp unit row, starting from the amp unit positioned at the end in a series of adjacent amp units. At the same time, a synchronous reference point of measurement timing is acquired and a cyclic pulse lighting process is automatically started. More specifically, according to this kind of multiple displacement sensor system, in order to prevent interference between the adjacent sensors, the light projection and light reception is sequentially performed with time difference. This light projection and light reception is performed in a cyclic manner between the adjacent amp units with a phase difference.

Thus, when the connection process is completed, a key input reception process is performed at step 1302 and an external input reception process is performed at step 1303. In the key input reception process at step 1302, it is determined whether any key input manipulation is performed at a manipulation part 25-1 or not by checking a signal from the manipulation part 25-1 shown in FIG. 12. In the external input reception process at step 1303, it is determined whether any command comes through the external input line or not, by checking a signal from the external input circuit 208.

In the subsequent input correspondence process at step 1304, various processes are performed based on the key input or the external input received at the above step. This input correspondence process will be described in detail with reference to detailed flowcharts when the several kinds of functions are described below.

In the SH-reception interrupt process, as shown in FIG. 13B, when the interrupt processes are started by receiving an SH (shake-hand) signal from the upstream side (amp unit), a delay process is carried out at step 1311 to provide a time difference of light projection between the adjacent sensors. Then, a light projection process and a light reception process are performed at steps 1312 and 1313, respectively to irradiate an object to be detected with pulse light, and then a measurement process is performed at step 1314. In this measurement process at step 1314, measurement data of the object to be detected is obtained according to specific algorithm of the displacement sensor.

In the subsequent measurement data transfer process at step 1315, the measurement data obtained in the above process and a group of measurement data received from the amp unit on the upstream side are SH-transmitted to the amp unit on the downstream side or the extension unit.

In the subsequent determination process at step 1316, a predetermined determination process is performed by applying one or more determination reference values to the measurement data obtained in the measurement process at step 1314, to determine whether the product such as an industrial product of the object to be measured is good or not. This determination is made by, for example, LOW (too low or too small), PASS (good), HIGH (too high or too large) and the like.

In the subsequent output process at step 1317, the result obtained in the above determination process at step 1316 is applied to the external output circuit 210 and output from the external output line.

FIG. 14 is a flowchart showing schematically the processes of the extension unit. As shown in FIG. 14, the entire processes of the extension unit comprises normal processes shown in FIG. 14A, high-order interrupt processes shown in FIG. 14B and SH-reception interrupt process shown in FIG. 14C.

In the normal processes, as shown in FIG. 14A, the processes are started when the power supply is turned on, and the same connection process as described above is performed at step 1401.

Then, similar to the case of the amp unit, a key input reception process and an external input reception process are performed at steps 1402 and 1403, respectively and then an input correspondence process and a routine process are performed at steps 1404 and 1405, respectively. In these two processes at steps 1404 and 1405, various processes corresponding to the key input and the external input are performed, which will be described in detail below together with descriptions of various kinds of functions.

According to the high order interrupt process, as shown in FIG. 14B, the processes are started by receiving a command from the high order (PC, PDA), in which various processes corresponding to the commands from the personal computer, for example are performed. This process comprises, as will be described below, a download process of an application program.

The SH-reception interrupt processes are started when interrupt occurs by receiving the SH signal from the low order (amp unit), which will be described in detail below together with descriptions of various kinds of functions.

Figure 15:
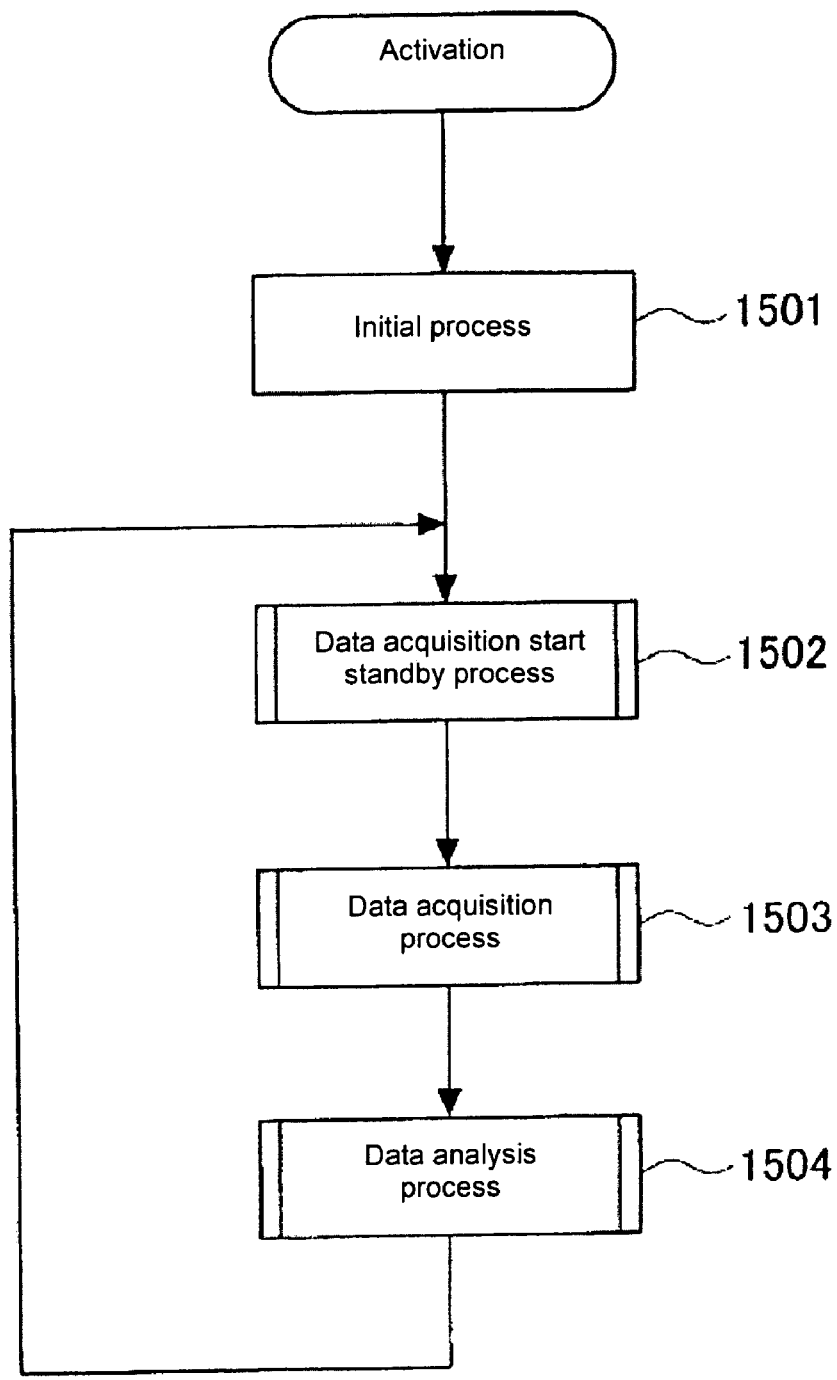
FIG. 15 shows a general flowchart showing data accumulation and analysis processes performed by the extension unit according to the present invention.

FIG. 15 is a general flowchart showing data accumulation/analysis process performed by the extension unit according to the present invention. As shown in FIG. 15, the entire processes shown in this general flowchart comprises an initial process at step 1501, a data acquisition start standby process at step 1502, a data acquisition process at step 1503, and a data analysis process at step 1504.

In the initial process at step 1501, amp type information and setup contents are acquired, amp setup contents are changed, an output state and a display state are initialized, and the like.

Figure 16A:
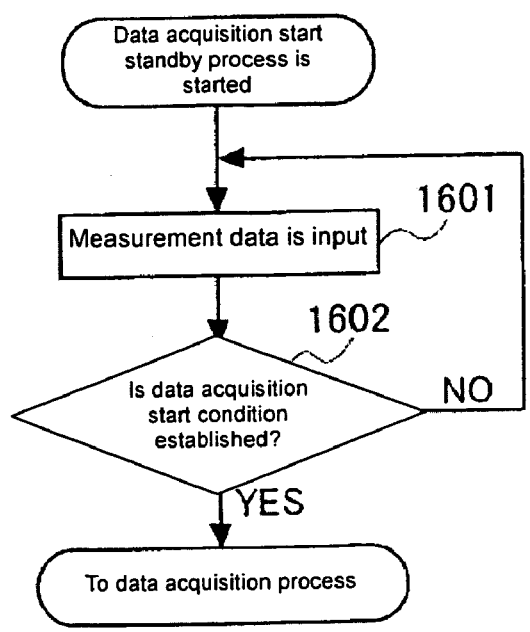
FIGS. 16A, 16B and 16C show detailed flowcharts showing processes of each part in FIG. 15.

In the subsequent data acquisition start standby process at step 1502, a start timing of the data acquisition (by self trigger/external input) is observed. FIG. 16A shows the data acquisition start standby process at step 1502 in detail. As shown in FIG. 16A, when the data acquisition start standby process is started, while a measurement data input process is carried out at step 1601, it is repeatedly determined whether a data acquisition start condition is established or not at step

1602. The data acquisition start condition at this time may be established by a self-trigger method based on a size of the input measurement data itself or its variation or the like, or may be established based on a state of the external input received in the external input reception process at step 1403. Here, the measurement data input process at step 1601 and the process for determining whether the data acquisition start condition is established or not at step 1602 are performed at the SH-reception interrupt process at step 1421 shown in FIG. 14C. That is, the measurement process at step 1314 is performed every time light is projected or received so that the measurement data is generated from each amp unit 2, and sequentially transmitted to the CPU 102 in the extension unit 1 through the transmission line BB by the bucket brigade method. Thus, the SH-reception interrupt process at step 1421 shown in FIG. 14C is performed, and the measurement data is transmitted from the amp unit 2 to the CPU 102 by the measurement data input process at step 1601. And then the determination process at step 1602 as to whether the data acquisition start condition is satisfied or not is performed, and the start timing of the data acquisition is determined based on the self-triggering or the external input. Thus, when it is determined that the data acquisition start condition is satisfied (YES, at step 1602), the data acquisition process is performed at step 1503.

Figure 16C:
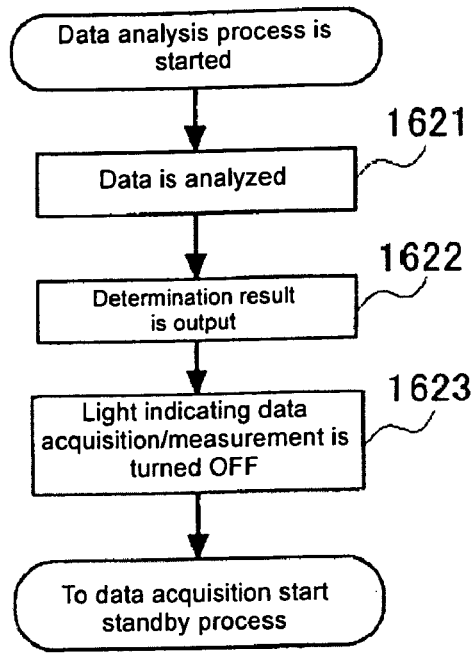
Figure 16B:
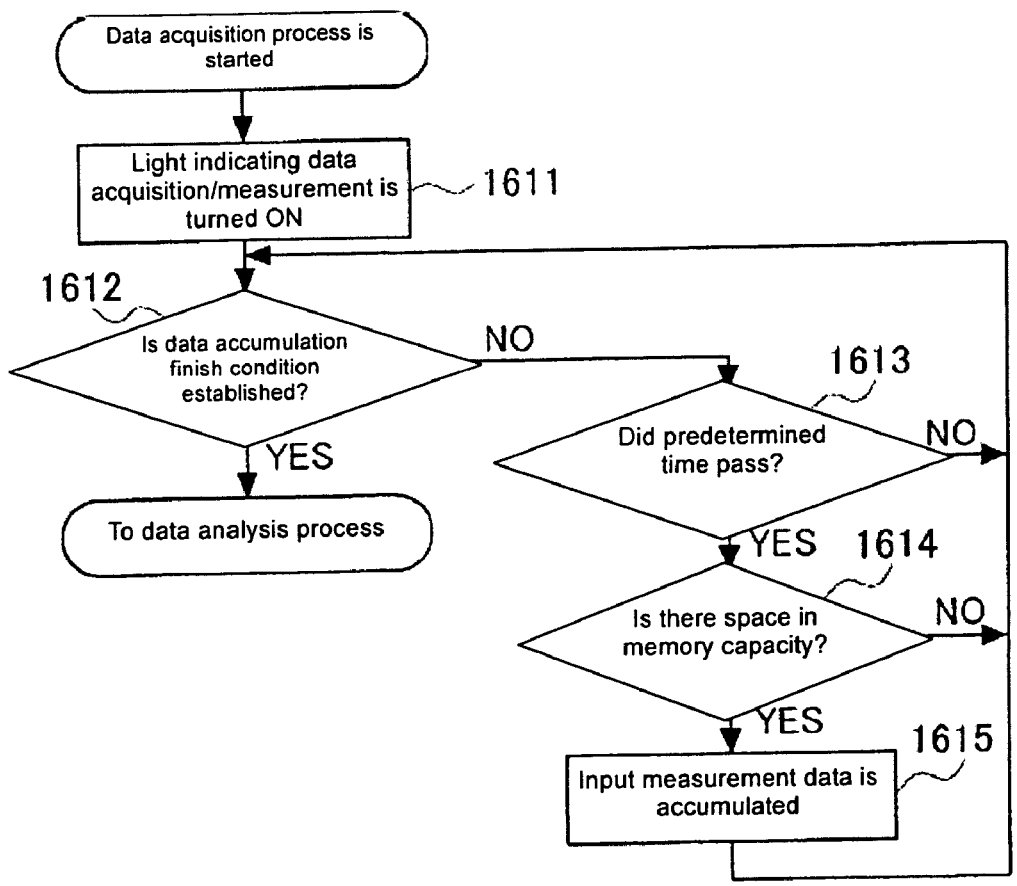

FIG. 16B shows the data acquisition process at step 1503 in detail. As shown in FIG. 16B, when the data acquisition process is started, a light indicating data acquisition and measurement is turned on at step 1611. Thus, the corresponding display operation is performed in the display part 23-2 in the extension unit. Then, it is determined whether data accumulation finish condition is established or not at step 1612. Here, since the data accumulation finish condition is not established at first, the determination is denied (NO, at step 1612), and then it is determined whether a predetermined time has passed from the previous data acquisition or not at step 1613. In this determination process, the data is acquired at constant time intervals. That is, since capacity of the measurement data accumulation memory 102a shown in FIG. 11 is limited, in order to acquire the measurement data corresponding to this capacity, a series of measurement data coming through the transmission line BB is thinned out so that the measurement data accumulation memory may not overflow. That is, it is repeatedly determined whether the data accumulation finish condition has been established or not and the predetermine time has passed or not at steps 1612 and 1613, respectively until the predetermined time has passed (NO at step 1613), and when the predetermined time passed (YES at step 1613) and there is a space in the memory 102a (YES at step 1614), the input measurement data is accumulated at step 1615. While the above processes are repeated, the series of measurement data coming through the transmission line BB is acquired at predetermined time intervals and sequentially stored in the measurement data accumulation memory 102a. Then, when the measurement data accumulation memory becomes full (NO at step 1614) or the predetermined data accumulation finish condition is established at step 1612 before then, a process for accumulating the input measurement data at step 1615 is skipped and the operation is moved to the data analysis process.

Referring to FIG. 15 again, in the data analysis process at step 1504, the accumulated data is processed and its result is output. FIG. 16C shows the data analysis process at step 1504 in detail. As shown in FIG. 16C, when the processes are started, the data analysis process is performed based on the series of measurement data stored in the measurement data accumulation memory 102a according to the predetermined algorithm at step 1621. In this data analysis process at step 1621, in general, the series of measurement data stored in the measurement data accumulation memory 102a are averaged to remove a noise component and then a characteristic point extraction process is performed according to the predetermined algorithm. Then, a predetermined calculation is performed based on the obtained characteristic point, so that objective information is provided. Then, the thus-provided data analysis result is compared with a predetermined threshold value to be determined and the determination result is output at step 1622. Then, the light indicating that the data is being acquired or measured is turned off and the data analysis process is completed.

Thus, the measurement data coming from each amp unit 2 through the transmission line BB is sequentially stored in the measurement data accumulation memory 102a in the CPU 102 of the extension unit until the data accumulation finish condition is satisfied at step 1612 or the memory capacity becomes full at step 1614. Then, the desired data analysis process is performed based on the series of measurement data stored in the measurement data accumulation memory 102a by performing the data analysis process at step 1621 and determination result output process at step 1622. Then, a control signal is output to the external input/output line through the external output circuit 107 on the extension unit side by carrying out the determination result output process at step 1622. Therefore, according to this embodiment, complicated data analysis and determination process based on the series of measurement data comprising time information can be performed only by mounting the extension unit 1 adjacently on the amp unit 2 without incorporating a complicated data analysis process and determination result output process in the conventional amp unit itself.

In addition, since the extension unit 1 can communicate with the personal computer 26 in this embodiment, optimum firmware can be incorporated in the extension unit 1 at user's side, by downloading the firmware itself, which comprises the initial process at step 1501, the data acquisition start standby process at step 1502, the data acquisition process at step 1503, and the data analysis process at step 1504 shown in FIGS. 15 and 16, from the personal computer 26 to the extension unit 1. In addition, since the series of measurement data for display can be uploaded from the extension unit 1 to the personal computer 26 in this embodiment, there can be provided an effect that an optimum threshold value can be set or the setting can be changed, viewing the displacement data row on a screen while the measurement circumferences are confirmed in real time, by connecting the personal computer 26 to the extension unit 1 and obtaining the measurement data from the extension unit 1 to the personal computer 26.

Figures 18A, 18B:
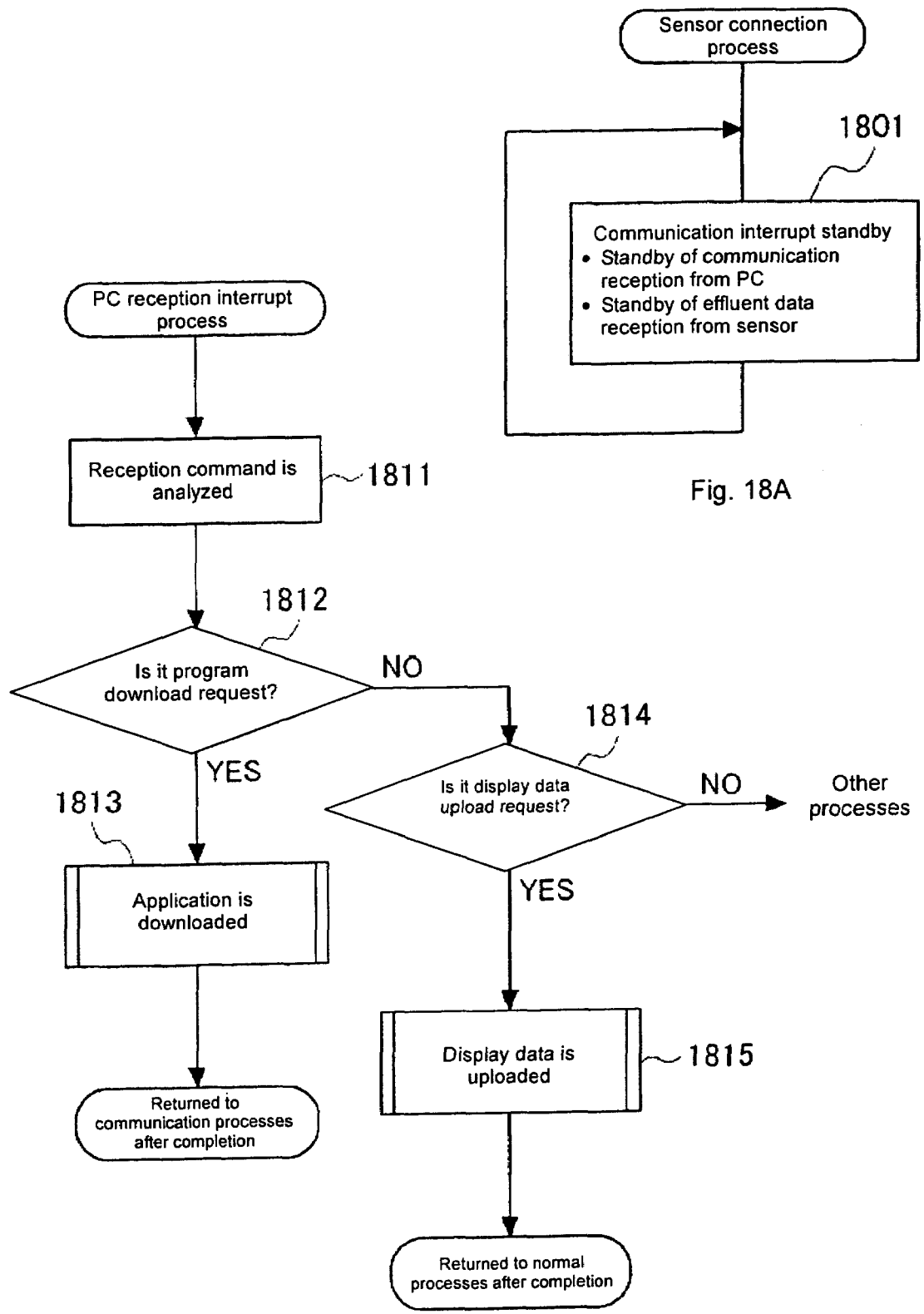
FIGS. 18A and 18B show flowcharts showing correspondence processes of a PC command.

More specifically, as shown in the flowchart in FIG. 18, on the side of the extension unit 1, a sensor connection process is performed and the extension unit 1 is in a communication interrupt standby state, that is, in standby states of communication reception from the PC, and effluent data reception from the sensor at step 1801. In this state, when a certain command comes from the personal computer 26 to the extension unit 1 and PC reception interrupt processes are started, a reception command is analyzed at step 1811, and either an application download process or a display data upload process is performed at step 1813 or at step 1815 according to its contents. That is, after the reception command is analyzed at step 1811, when its result is determined to be a program download request at step 1812, the application download process is performed at step 1813 and a firmware program corresponding to the series of processes (at steps 1501 to 1504) shown in FIGS. 15 and 16 are downloaded from the personal computer 26 into the program memory (a flash memory, for example) in the extension unit 1. Therefore, by using this function, after the extension unit 1 is provided adjacent to the series of amp units 2 and the personal computer 26 is connected to the extension unit 1, when a predetermined program download request command is transmitted from the personal computer 26, this is confirmed by the extension unit 1 at step 1812 and an application download process is carried out at step 1813. As a result, the firmware program corresponding to the desired data analysis process can be downloaded from the personal computer 26 to the extension unit 1.

Next, a description will be given of the operation for uploading the series of measurement data for display from the extension unit 1 to the personal computer 26.

As shown in FIG. 11, there is provided a display data accumulation memory 102b in the CPU 102 of the extension unit 1 other than the measurement data accumulation memory 102a. As will be described in detail below, in the display data accumulation memory 102b, the measurement data which is obtained at the predetermined time intervals from the series of measurement data coming through the transmission line BB is stored as measurement data for display. As shown in FIG. 17, the measurement data stored in the display data accumulation memory 102b is sampled at display data accumulation timing which is considerably wider than the accumulation timing of the measurement data, and then stored. That is, since the display data accumulation memory 102b is uploaded to the personal computer 26 through the communication line, considering that the communication between the personal computer 26 and the extension unit 1 is performed by RS-232C, it is necessary to limit a data amount in order to implement high-speed transmission. Therefore, the interval of accumulation timing for the display data shown in FIG. 17A is set so as to be wider than that for the measurement data. In addition, FIG. 17C shows the case where a measurement data accumulation condition is established and the case where it is not established. That is, when the measurement data accumulation condition is established and becomes "H" state, as shown in FIG. 17B, the measurement data is accumulated in that period. Meanwhile, the display data is stored in the display data accumulation memory 102b at the display data accumulation timing having constant wide intervals over an entire period regardless of whether the measurement data accumulation condition is established or not. Thus, the display data is accumulated in the display data accumulation memory 102b over the entire section including not only the state in which the objective product on the transmission line is measured in the viewing field of the displacement sensor, but also the state before and after the measurement. Therefore, when the display data is uploaded to the personal computer 26, since the conditions before the objective product comes into the viewing field of the displacement sensor and after it goes out of the viewing field can be viewed on the side of the personal computer 26, the time displacement of the measurement data can be confirmed in real time and the size of the measurement data can be finely confirmed on the screen, so that the optimum threshold value can be found out.

FIG. 19 is a view showing a concrete example of the application suitable for the displacement sensor system according to the present invention. In this example, as shown in FIG. 19A, a work W and a sensor head 9 of a displacement sensor are relatively moved and a series of displacement data thus obtained is stored in the measurement data accumulation memory 102a through the procedures described above. Then, peak values P1 and P2 and bottom values B1 and B2 are found in time regions TA and TB, respectively by analyzing the data as shown in FIG. 19B, and a difference between them is found to determine a step difference in a specific region.

That is, according to this example, the two periods TA and TB separated by a predetermined time are set as data accumulation periods in a period where a measurement value is lower than a predetermined trigger level L3. The trigger level L3 in this embodiment is set based on the measurement value corresponding to a face which is highest in the work W. According to this embodiment, a maximum value and a minimum value are found from the data accumulated in each period of the data accumulation periods TA and TB. In FIG. 19B, "P1" and "B1" correspond to the maximum and minimum values in the period TA, respectively. In addition, "P2" and "B2" correspond to the maximum and minimum values in the period TB, respectively. In this system, a difference between the maximum value and minimum value in each of the periods TA and TB can be obtained. Furthermore, an arithmetic process can be performed using data of both periods TA and TB, that is, a difference h between the maximum value PA in the period TA and the minimum value B2 in the period TB can be found, for example.

According to the conventional displacement sensor, although there is provided a function of holding the maximum value or the minimum value of the measurement values obtained in the predetermined measurement period, since there is not provided a function of holding the plurality of measurement values, only a distance between the highest face and the lowest face is measured. Therefore, in order to measure each step difference in the work W shown in FIG. 19A in detail, it is necessary to use a plurality of sensors. Meanwhile, according to this embodiment, the objective measurement process can be carried out by setting the period corresponding to the measurement purpose from the measurement data obtained in the period in which the work W passes through a detection region of the sensor head 9, as the data accumulation period. As a result, the measurement process can be performed using the single sensor head 9 in more detail as compared with the conventional equipment.

FIG. 20 is a timing chart for explaining the data acquisition and analysis operation. As shown in FIG. 20, when the data acquisition condition is established, the data is acquired over that period and when the data acquisition is completed, the data is analyzed. The light indicating that the data is being acquired and measured is on over the entire period of data acquisition and analysis and when the data acquisition and data analysis are completed, a determination output is generated.

Figure 21:
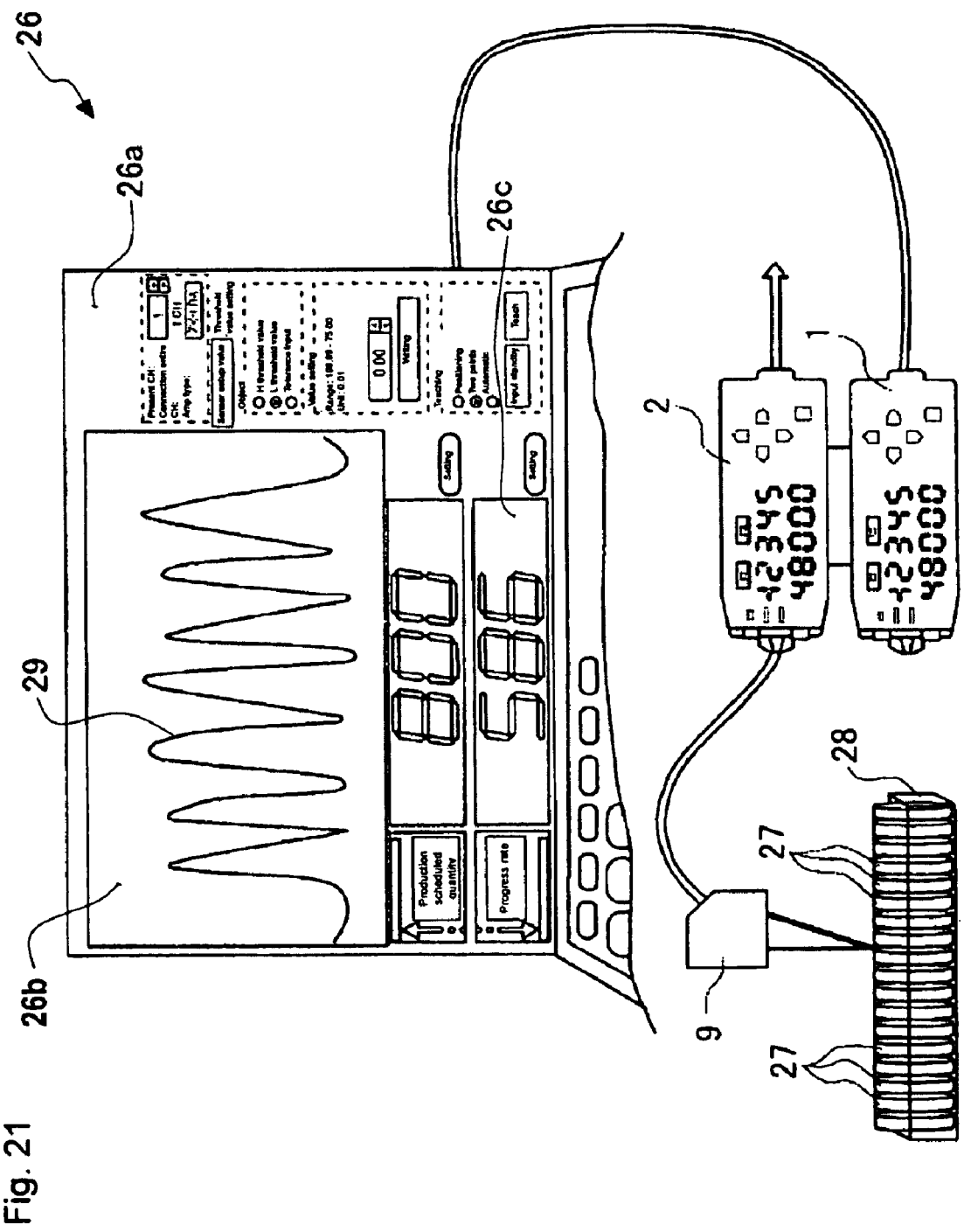
FIG. 21 shows a view showing a constitution of a multiple displacement sensor system.

Next, a description will be given of a multiple displacement sensor system shown in FIG. 21. According to the multiple displacement sensor system, N amp units 2 (there is one amp unit in the figure) are adjacently provided and the extension unit 1 is connected to the personal computer 26. In this system, N sensor outputs are sent to the extension unit 1 and the result of the measurement process is displayed in a display 26a of the personal computer 26. In addition, various kinds of settings are performed from the personal computer 26 to the extension unit 1. Furthermore, the number of measurement objects 27 is measured by irradiating the object 27 housed in a tray 28 with laser beam output from the sensor head unit 9, for example. At this time, a displacement waveform 29 of the measurement object is displayed in a waveform display region 26b and the counted number is displayed in a counted value display region 26c.

Figure 22:
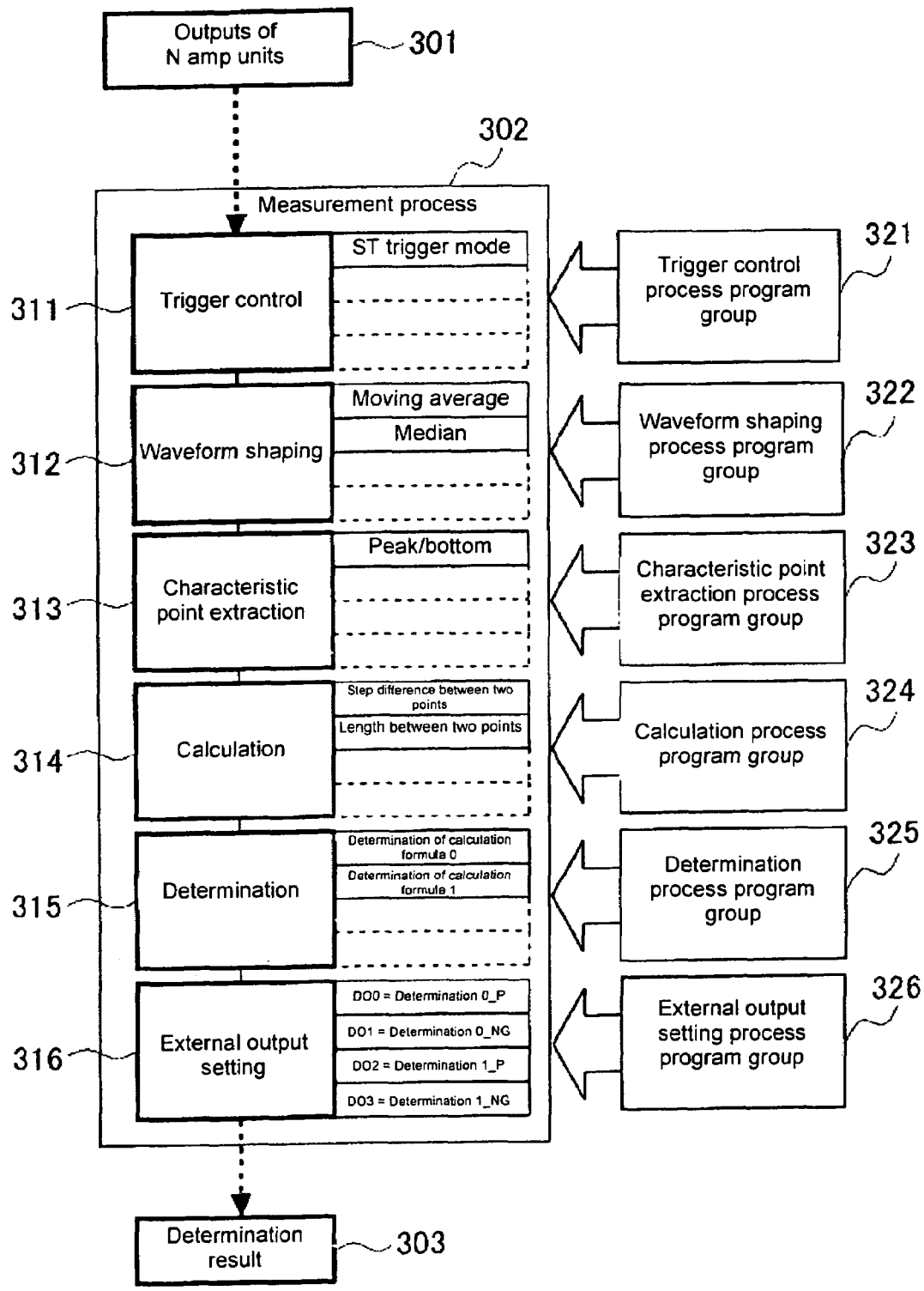
FIG. 22 shows a view explaining an entire measurement process according to this embodiment.

FIG. 22 is a view for explaining a concept of measurement algorithm incorporated in the sensor system according to this embodiment. The extension unit 1 performs a predetermined measurement process 302 on the outputs 301 of the N amp units and a determination result 303 is output to the personal computer 26. The measurement process 302 is divided to six measurement stages (referred to as categories hereinafter) arranged in chronological order. That is, the six measurement stages are a trigger control category 311 (first step) for defining a start and an end of the measurement process according to the external signal or the self-trigger, a waveform shaping category 312 (second step) for removing a noise from waveform data output from the sensor head unit, a characteristic point extraction category 313 (third step) for extracting a characteristic point from the shaped waveform, a calculation category 314 (forth step) for performing a predetermined calculation based on the extracted characteristic point, a determination category 315 (fifth step) for carrying out a predetermined determination process for the shaped waveform by the calculation result and a predetermined threshold value, and an external output setting category 316 (sixth step) for outputting the determination result to the outside.

A process program selected from a trigger control process program group 321 is allotted to the trigger control category 311 by manipulation of the personal computer 26. The process program is a component of the measurement algorithm and it is a segment of the measurement algorithm. Although a detailed description will be given below, according to the example shown in FIG. 22, the process program "ST trigger mode" is set in the trigger control category 311. Similarly, one or more process programs selected from a waveform shaping process program group 322, a characteristic point extraction process program group 323, a calculation process program group 324, a determination process grogram group 325, and an external output setting process program group 326 are allotted to the process categories 312 to 316, respectively. Thus, the process programs allotted to the process categories 312 to 316 form the measurement algorithm and the process programs are sequentially performed to perform the measurement process.

As shown in FIG. 11, a ROM 102c (storing part) is provided in the CPU 102 of the extension unit other than the measurement data accumulation memory 102a and the display data accumulation memory 102b. A plurality of process programs are previously stored in the form of library so as to correspond to various kinds of measurement processes. When one measurement process is performed, one or more process programs corresponding to the category are selected from the library and execution sequence is set. The process program of the waveform shaping category 312 is called a waveform shaping process program, the process program of the characteristic extraction category 313 is called a measurement process program, the process program of the calculation category 314 is called a calculation process program, the process program of the determination category 315 is called a determination process program, and the process program of the external output setting category 316 is called an output process program.

In the EEPROM 108 (rewritable storing part) of the extension unit 1, an execution sequence of the process programs constituting the measurement algorithm to be carried out and information (identification information) of the process programs are set. A measurement process table comprising the execution sequence and execution addresses of the process programs is formed from the contents of the ROM 102c and the contents of the EEPROM 108, in a RAM of the CPU 102. The measurement process is performed based on the measurement process table.

Before the execution sequence of the process programs is set in the EEPROM 108, a user should consider an extraction method or a calculation formula for a characteristic amount, so as to correspond to the kind of measurement item and the kind of measurement circumstances of the measurement object, using the sensor system according to this embodiment.

According to the selected contents, the desired process program (the program regarding the extraction method or the calculation formula of the characteristic amount and the like) is selected from the process program group by category on the personal computer, and it is set as the process program to be executed. FIG. 23 is a view for explaining the setting at this time. A table shown in FIG. 23 shows (a) name of process category, (b) process program No., and (c) process program list. One or more process program register regions (No. 0 to 9) are prepared in each process category. For example, four or less process programs can be registered in the waveform shaping category, and ten or less process programs can be registered in the characteristic point extraction category. The process program No. designates a processing procedure of the process program. That is, in the example shown in FIG. 23, the process program No. 0 in the trigger control category is carried out and then the process program No. 0, the process program No. 1, the process program No. 2 and the process program No. 3 in the waveform shaping category are sequentially carried out. Then, the process program No. 0 in the characteristic point extraction category is performed and so on. In the (c) the process program list, process program options to be registered are illustrated by category. In each category, the process program selected from the list in (c) is set so as to correspond to the process program No. in (b).

Referring to FIG. 22 again, the "ST trigger mode" is set as the process program selected from the trigger control process program group 321, in the trigger control category 311, for example. Similarly, as the process program, "moving average" and "median" are set in the waveform shaping category. In addition, the process program "peak/bottom" is set in the characteristic point extraction category, the process programs "step difference between two points" and "length between two points" are set in the calculation category and the process programs "determination of calculation formula 0" and "determination of calculation formula 1" are set in the determination category.

The process program "ST trigger mode" shows the case where a timing input is needed in measurement but the accumulation process is not needed, in which a time required for one measurement becomes a measurement cycle. In the process program "moving average", an averaged value is calculated by the set number of times, in which the process is performed by shifting the data by one each measurement cycle. In the process program "median", a central value of the set filter size (the number of objective data) is output, in which the process is performed by shifting the data by one each measurement cycle. In the process program "peak/bottom", the peak and the bottom are extracted from the waveform data as the characteristic points used in the calculation. In the process programs "step difference between two points" and "length between two points", a difference in height between the peak and bottom and a difference in horizontal position between the peak and bottom are calculated. In the process program "determination of calculation formula 0", HIGH, PASS or LOW is determined by comparing the calculation result of the calculation formula 0 with the predetermined threshold value. In addition, in the four process programs allotted to the external output setting category, the process for allotting the determination result to be output or setting the output condition is performed on the four outputs of DO0 to DO3 provided for external outputs.

Figure 24:
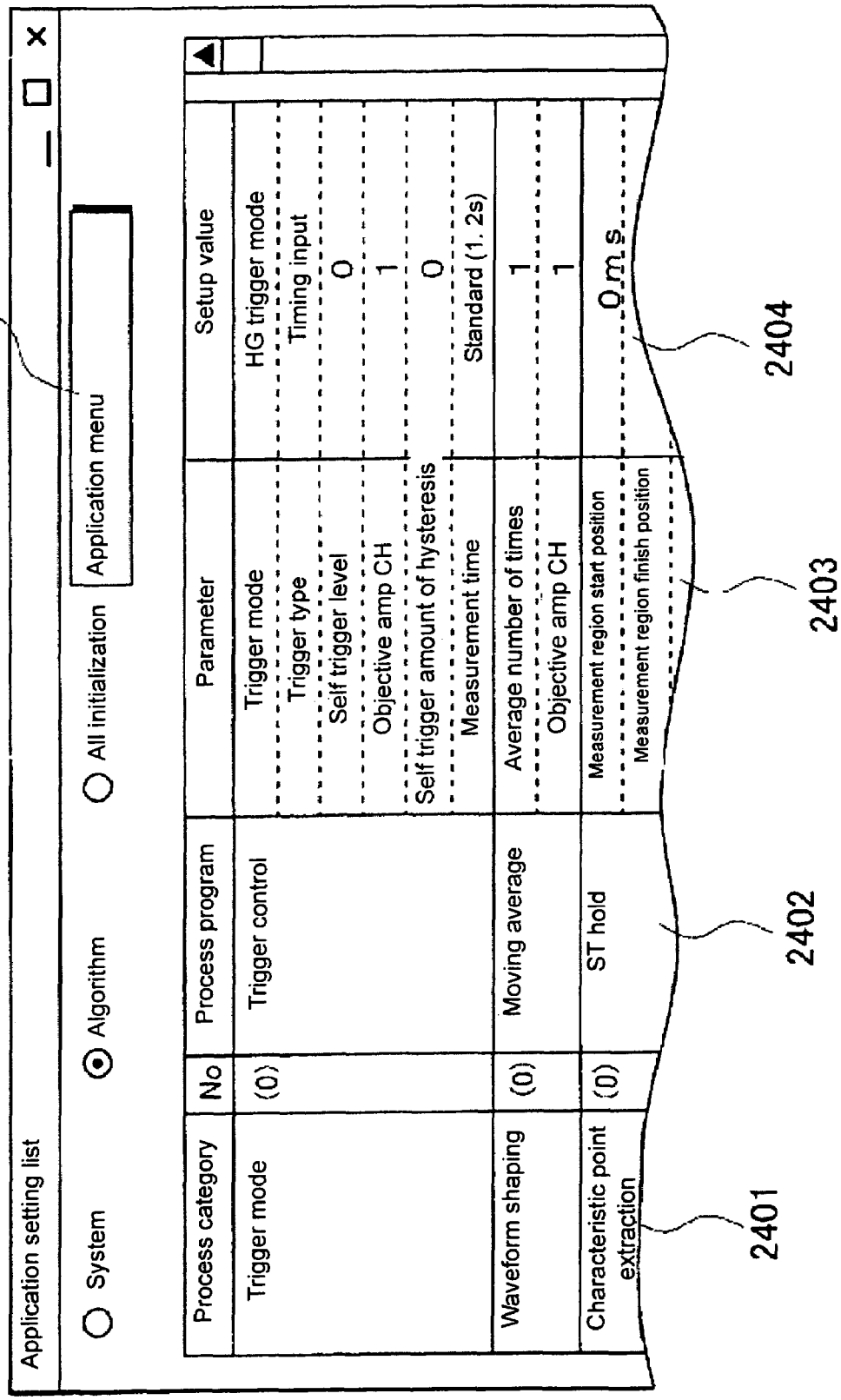
FIG. 24 shows a view showing a screen on which the process program and a parameter are set.

FIG. 24 is a view showing a screen example which is displayed on the personal computer 26 when the process program constituting the measurement algorithm is set. In this screen, a process category display region 2401, a process program display region 2402, a parameter display region 2403, and a setup value display region 2404 are provided. As shown in FIG. 24, one process program is provided with several parameters and detailed setting is enabled by changing the setup value of the parameter. For example, the process program "moving average" comprises "average number of times" and "objective amp unit channel" as parameters, in which the setup value of the parameter can be changed.

According to the sensor system of this embodiment, when the process program constituting the measurement algorithm is set from the personal computer 26, it is constituted so as to be set in an administrator mode or in a user mode. The user mode is for a beginner user and the administrator mode is for a user who is conversant with setting manipulation. In the administrator mode, in view of the predetermined entire measurement algorithm, the process program is selected and registered in the process procedures or deleted, and the parameter value, which can be changed, of the process program can be set (first setting system). Meanwhile, in the user mode, the parameter value of the process program can be changed only (second setting system).

More specifically, in the administrator mode, the process program display region 2402, the parameter display region 2403, and the setup value display region 2404 in the screen example shown in FIG. 24 can be changed. Meanwhile, in the user mode, only the setup value display region 2404 in the screen example shown in FIG. 24 can be changed. Thus, since the process program cannot be registered nor deleted in the user mode for the beginner, it is prevented that the beginner user changes the algorithm by mistake and cannot restore it.

Figure 25:
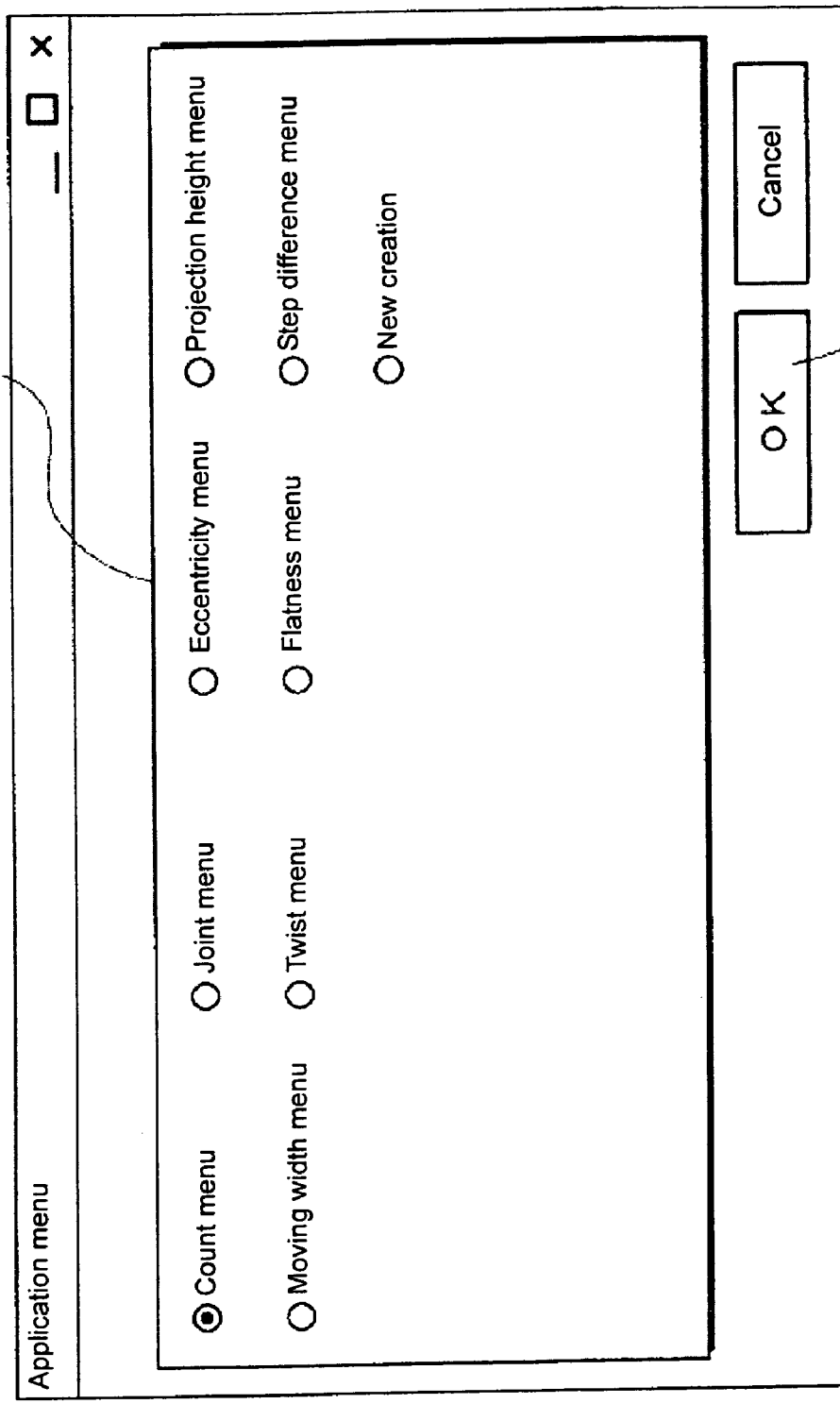
FIG. 25 shows a view showing a screen of an application menu.

According to the sensor system of this embodiment, the plurality of algorithms (application menus) which assume the predetermined measurement process are previously stored in the EEPROM 108 so that the registration of the process program constituting the measurement algorithm and the setting of the parameter of the process program may not be started from the beginning. When an application menu button 2405 is pressed in the screen shown in FIG. 24, a screen shown in FIG. 25 is displayed. In a screen display example shown in FIG. 25, there are provided a menu display/setup region 2501 and a setup confirmation button 2502.

In this example, as the application menus, there are provided a count menu, a joint menu, an eccentricity menu, a projection height menu, a moving width menu, a twist menu, a flatness menu, and a step difference menu.

The count menu is a menu for counting the number of works (measurement object), which is applied to counting of the number of containers or envelops, for example.

The joint menu is a menu for detecting a fine step difference or a joint, which is applied to detection of a joint of a tape or fiber whiskers on a belt. More specifically, a noise component/waviness is removed from the displacement signal of the moving work and the step difference (or a joint, an edge, a foreign material, a chip, a crack and the like) is extracted.

The eccentricity menu is a menu for measuring eccentricity of a rotating work, which is applied to eccentricity measurement of a roller or a rotating gear or the like.

The projection height menu is a menu for measuring a height of the projection or a groove of the work, which is applied to measurement of an inserted amount of a rivet or a height of an electronic device or the like. More specifically, the height of the projection (or groove) is found from height data of three points in total comprising the projection point (or the groove point) of the moving work and its forward and backward points.

The moving width menu is a menu for measuring a width of the projection or the groove of the work, which is applied to measurement of a distance between the works on a conveyer or a width of a building material or the like. Here, the width of the projection (or groove) of the work is found from a distance between crossing points obtained when the displacement signal of the moving work crosses a previously set edge level.

The twist menu is a menu for measuring a twist in a work surface, which is applied to a twist test of a steel plate or a disk surface or the like using four amp units. The twist amount is found by measuring surface heights of four corners in the stationary work surface by four sensor head units and providing the difference between the heights.

The flatness menu is a menu for measuring flatness of the work surface, which is applied to a flatness test of a robot arm or a brake pad or the like. The flatness of the work is found by measuring the surface heights in the same surface of the stationary work by three to five sensor head units and providing a difference between a maximum value and a minimum value of the heights.

The step difference menu is a menu for measuring a step difference between the work surfaces, which is applied to a dimension test of the projection or recess of a die or HDD chassis or the like. The step difference between work surfaces is found by measuring the surface heights of a reference surface of the stationary work and the measurement object surface by three to five sensor head units and providing a difference of the heights between the reference surface and the measurement object surface.

According to the sensor system of this embodiment, the measurement algorithm optimal to the user can be easily formed by changing the setup value of the parameter of the process program and the like with the above-mentioned application menu used as a sample. In addition, a newly created algorithm can be registered in the menu.

Figure 26:
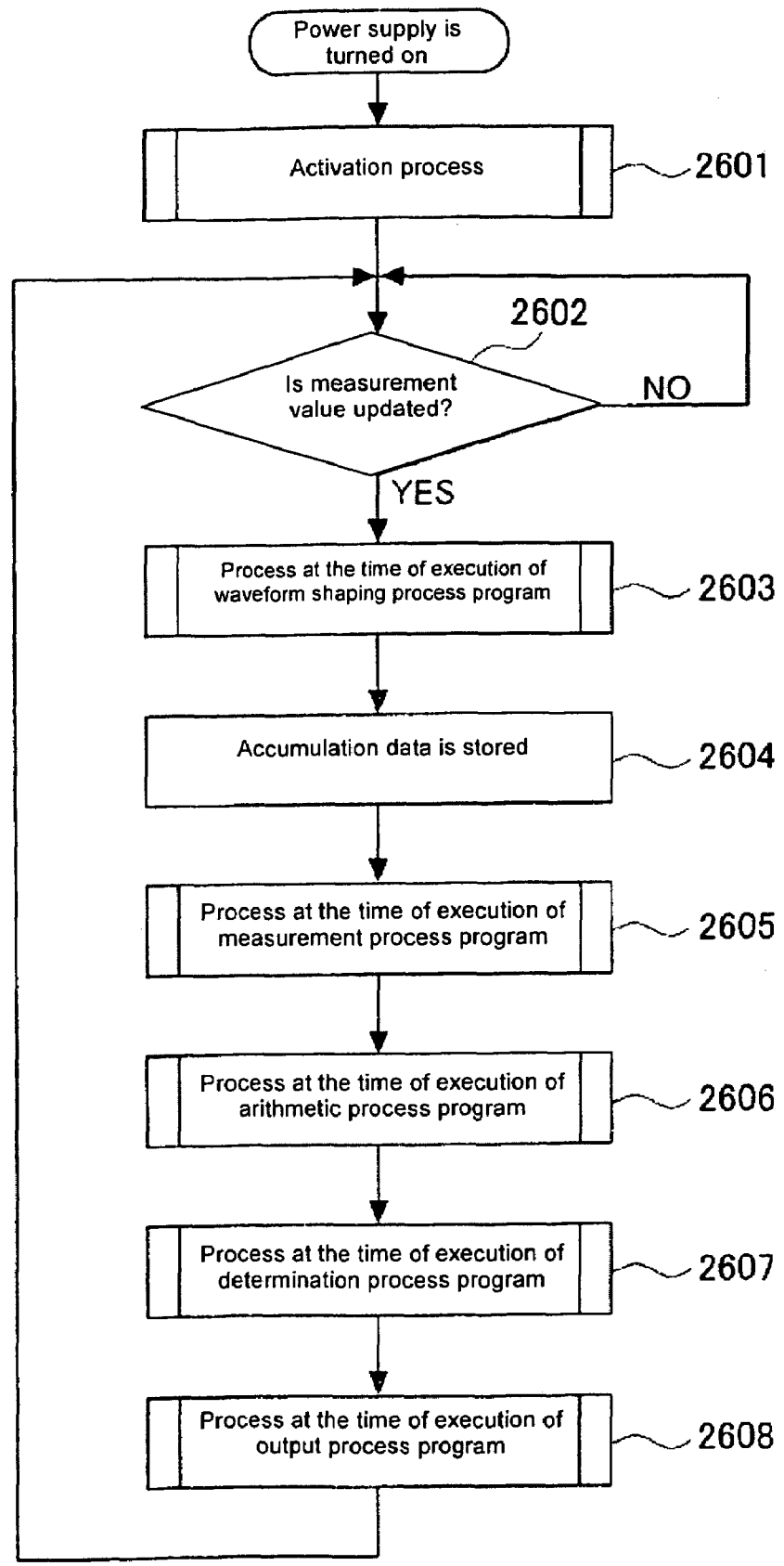
FIG. 26 shows a general flowchart showing processes of the extension unit.

Next, a description will be given of operations of the extension unit 1 when the measurement algorithm in which the process programs are set by category is carried out. FIG. 26 is a general flowchart showing the operations of the extension unit 1.

When the operations are started by turning on the power supply, a process at start-up such as an initial process or the like is performed at step 2601 and then it is determined whether a measurement value is updated by interruption from the high order amp unit 2 or not at step 2602.

When the measurement value is updated in accordance with the contents of the measurement process table (the table showing the execution sequence and the execution address of the process program in correspondence with each other), a process at the time of execution of the waveform shaping process program at step 2603, a process of accumulation data storing at step 2604, a process at the time of execution of the measurement process program at step 2605, a process at the time of execution of the arithmetic process program at step 2606, a process at the time of execution of the determination process program at step 2607 and a process at the time of execution of the output process program at step 2608 are sequentially carried out.

Figure 27:
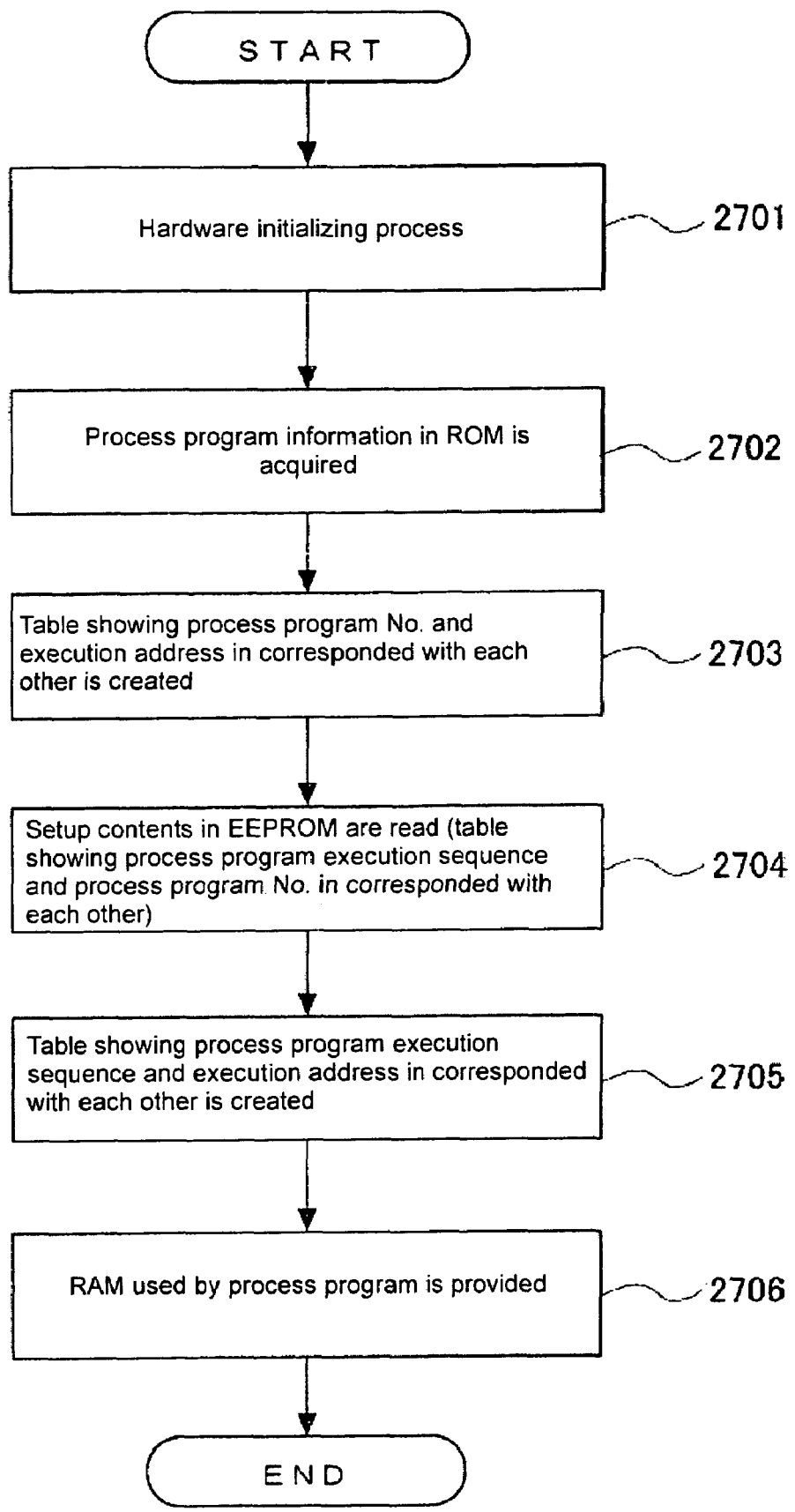
FIG. 27 shows a flowchart showing a detail of a process at the time of activation.

FIG. 27 is a flowchart showing the process at start-up at step 2601 in detail. In that process, after a hardware initializing process is performed at step 2701, process program information (process program No. (identification information), process program contents, execution address) stored in the ROM 102c in the CPU 102 is obtained at step 2702, and a table showing the process program No. and the execution address in correspondence with each other is created at step 2703.

Then, setup contents stored in the EEPROM 108 are read at step 2704. This setup contents are the table showing the execution sequence of the process program and the process program No. in correspondence with each other.

Then, a table (measurement process table) showing the execution sequence and the execution address of the process program in correspondence with each other is created at step 2705.

Then, a RAM region which is used when the process program is carried out is obtained at step 2706. In this region, the setup parameter and measurement result are provided.

Figure 28:
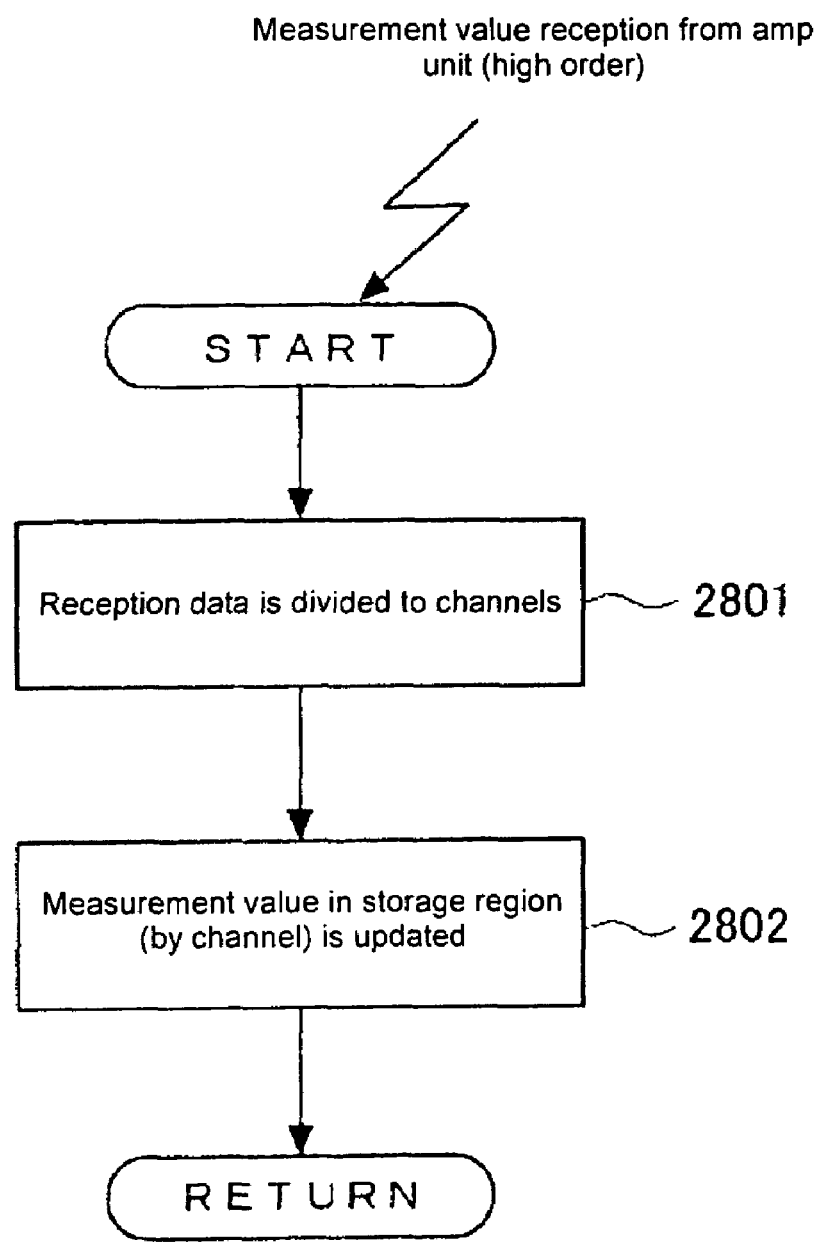
FIG. 28 shows a flowchart showing a process at the time of interruption by receiving a measurement value.

As shown in FIG. 28, a process at the time of interrupt of measurement value reception is started by the interrupt of the measurement reception from the amp unit 2 (high order), in which received data is sorted into N channels (CH) corresponding to the N amp units 2 at step 2801. Then, the measurement value stored in the measurement value storage region by channel is updated at step 2802.

Figure 29:
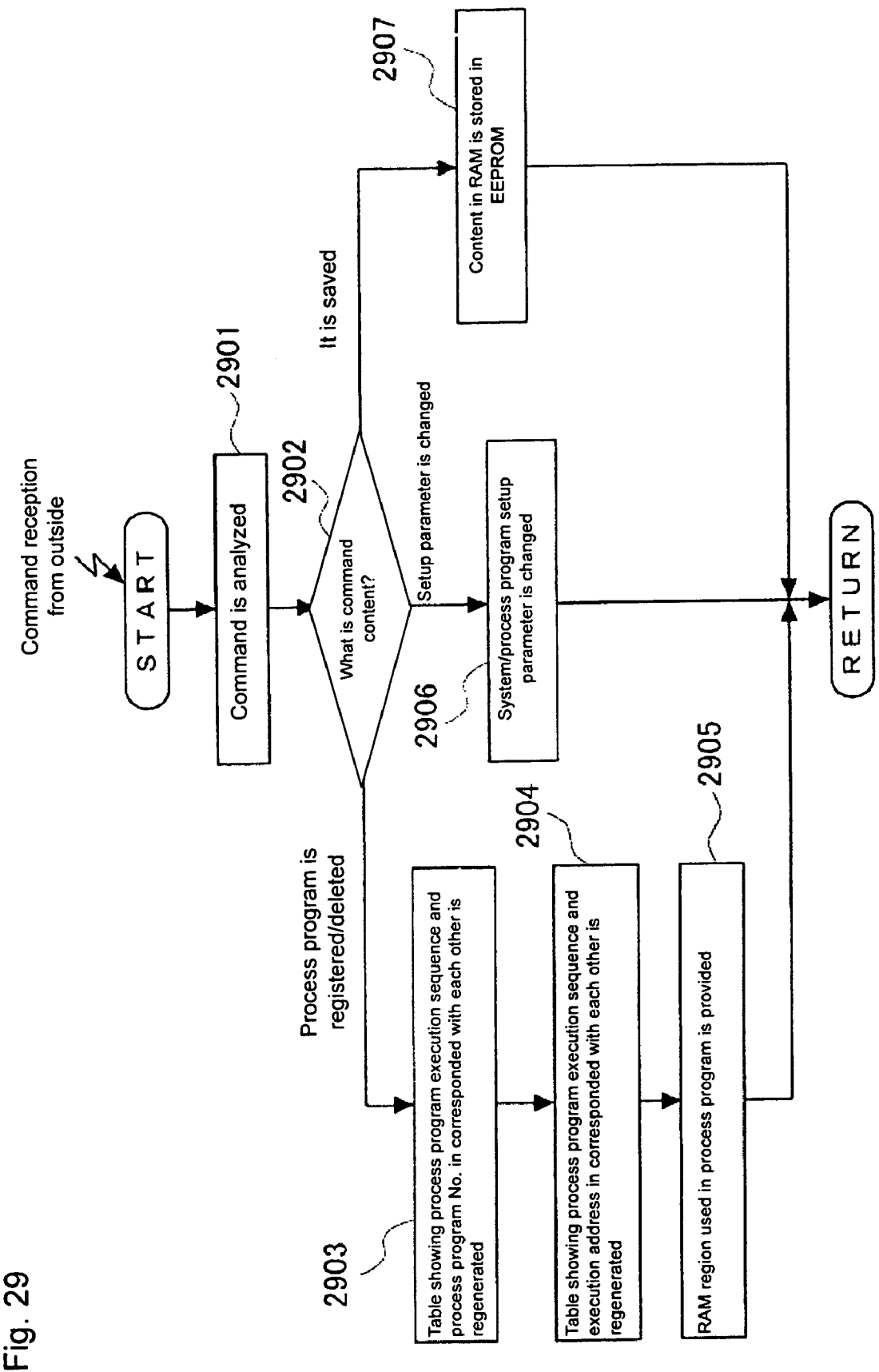
FIG. 29 shows a flowchart showing a process at the time of interrupt by command reception from the outside.

As shown in FIG. 29, a process at the time of interrupt by command received from the outside is started by the interrupt of the command received from the outside and the command is analyzed at step 2901. Then, it is determined whether the contents of the command are either "the process program is registered or deleted", "setup parameter is changed" or "it is saved" at step 2902.

When the command is that "the process program is registered or deleted", the table showing the execution sequence and the process program No. of the process program in correspondence with each other (the table which is read by the EEPROM 108 at step 2704) is generated again at step 2903. Then, the table showing the execution sequence and the execution address of the process program in correspondence with each other (measurement process table) is generated again at step 2904 and the RAM region which is used when the process program is performed is provided at step 2905.

When the command is that "setup parameter is changed", the setup parameter of the system or the setup parameter of the process program is changed at step 2906. Here, the setup parameter of the system includes the number of connected amp units 2, for example.

When the command is that "it is saved", the content in the RAM is stored in the EEPROM 108 at step 2907. The content to be stored includes data such as setup parameter of the system, the execution sequence table of the process program, setup parameter of the process program or the like.

Figure 30B:
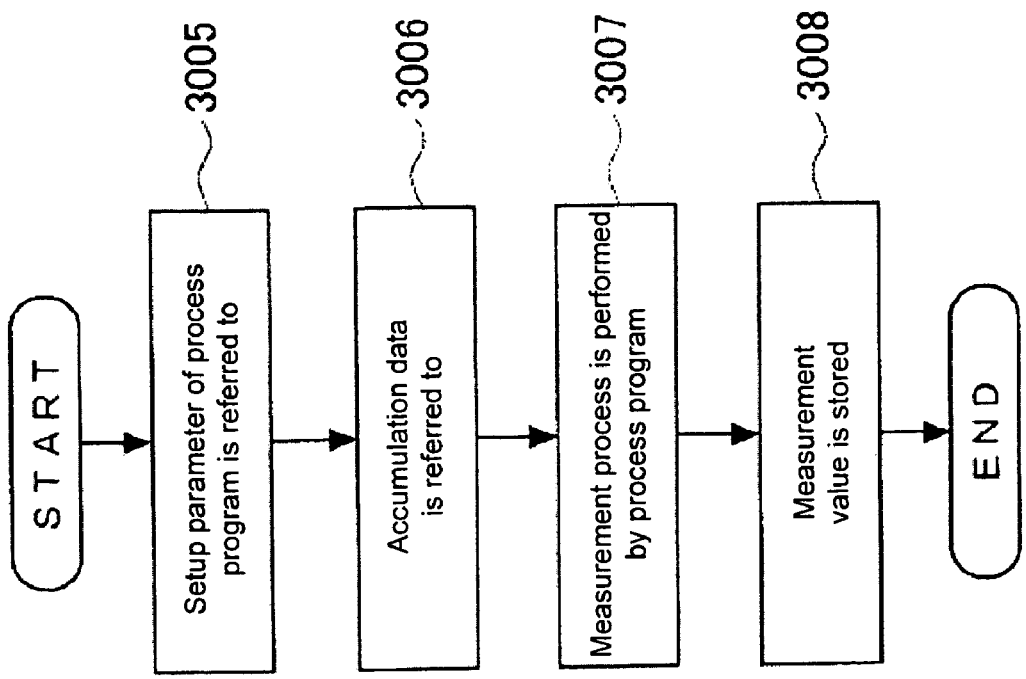
FIGS. 30A and 30B show flowcharts showing a process at the time of execution of each process program.
Figure 30A:
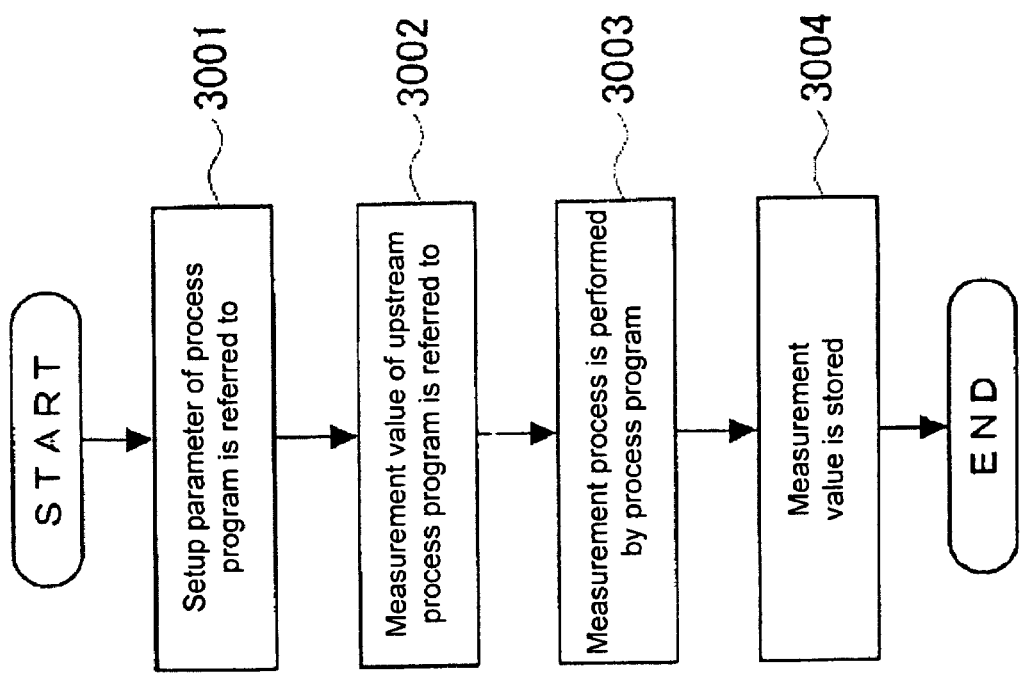

FIG. 30 is a flowchart at the time of execution of each process program. The flowchart shown in FIG. 30A comprises the process at the time of execution of the waveform shaping process program at step 2603, the process at the time of execution of the arithmetic process program at step 2606, the process at the time of execution of the determination process program at step 2607, the process at the time of execution of the output process program at step 2608 and the process at the time of execution of the sequential type of measurement process program at step 2605.

When the process is started, a setup parameter of this process program is referred to at step 3001. Then, the measurement value of upstream process program is referred to at step 3002. For example, when the arithmetic process program is carried out, the measurement value of the waveform shaping process program is referred to. Then, the measurement process is executed for each process program at step 3003. Finally, the measurement value is stored in the RAM at step 3004.

In the process at the time of execution of the measurement process program at step 2605, an accumulative type of process is performed other than the sequential type of process. FIG. 30B is a flowchart showing the accumulative type of process. When the process is started, the setup parameter of the process program is referred to at step 3005. Then, accumulation data stored in the measurement data accumulation memory 102a is referred to at step 3006. Then, the measurement process is performed for each process program at step 3007. Finally, the measurement value is stored in the RAM at step 3008.

Figure 31A:
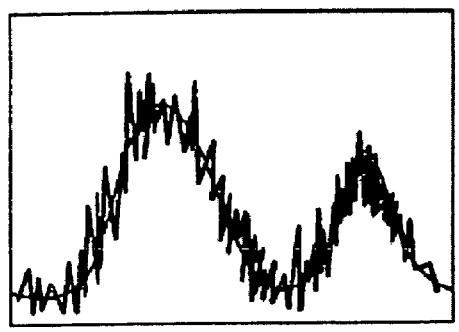
FIGS. 31A, 31B, 31C and 31D show views explaining an operation in which a displacement waveform is processed.
Figure 31B:
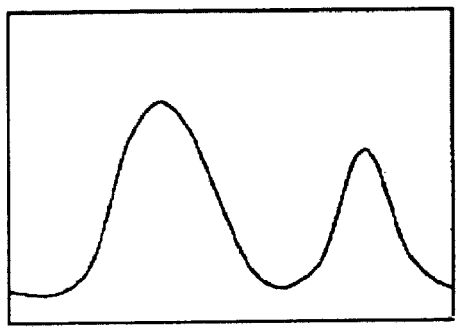
Figure 31C:
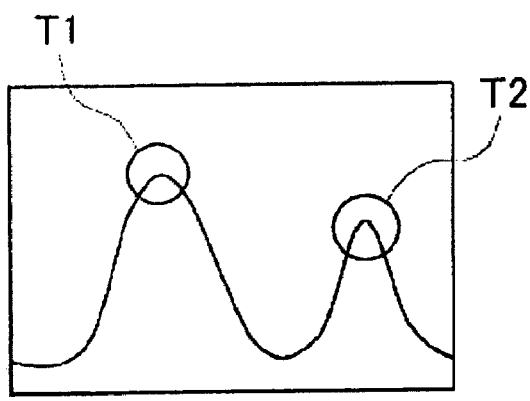
Figure 31D:
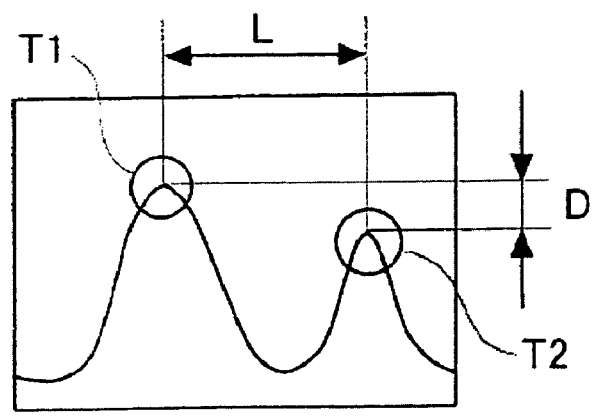

Next, a description is given of an operation in which two-dimensional data (displacement waveform) constituted by "displacement and time" sensed by this system is processed so as to become data desired by the user. It is assumed that either process program of "averaged process" and "median" is selected in the process at the time of execution of the waveform shaping process program at step 2603, a process program of "top" is selected in the process at the time of execution of the measurement process program at step 2605, either process program of "step difference between two points" and "length between two points" is selected in the process at the time of execution of the arithmetic process program at step 2606. In waveform data shown in FIG. 31A which is obtained by the sensor head unit 9, a noise is removed by the process at the time of execution of the waveform shaping process program at step 2603. Thus, waveform data shown in FIG. 31B is obtained. When the process at the time of execution of the measurement process program at step 2605 is performed, tops T1 and T2 are extracted as characteristic points as shown in FIG. 31C. Furthermore, when the process at the time of execution of the arithmetic process program at step 2606 is performed, a step difference D between the tops T1 and T2 and a length L between the two points are found as shown in FIG. 31D. Thus, the data D and L is determined and output, so that the data required by the user can be provided.

Next, a description will be given of a sectional area measurement application as one example when the sequential process and accumulative process are used together in the process at the time of execution of the measurement process program at step 2605 is performed.

Figure 32:
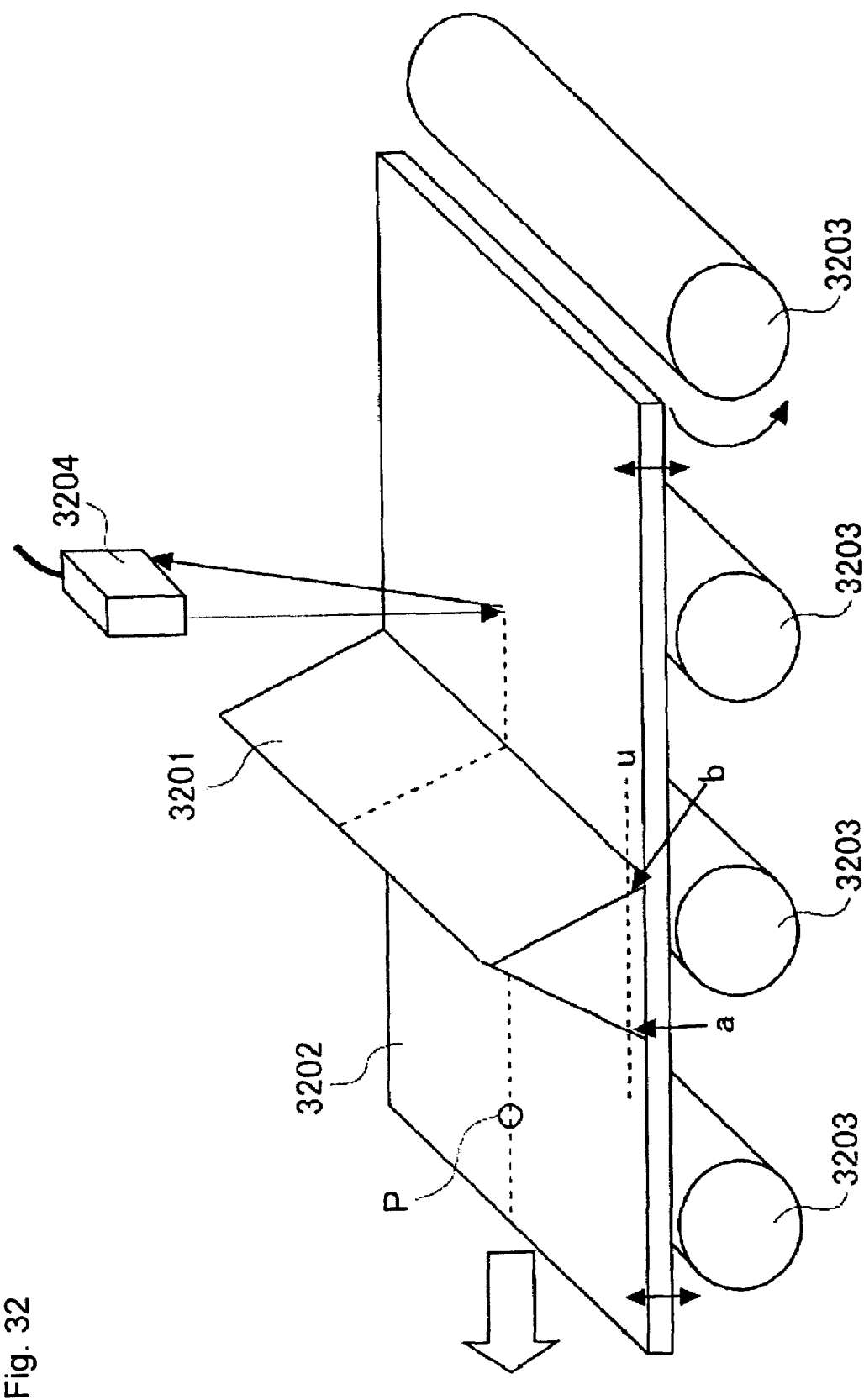
FIG. 32 shows a view explaining a sectional area measurement application

As shown in FIG. 32, it is assumed that a work 3202 having a projection (triangle shape) 3201 on a flat plate surface is set on rollers 3203 and when the work 3202 is moved by rotating the roller 3202, a peak and a sectional area of the projection 3201 are measured by applying laser from a displacement sensor 3204 of this embodiment which is arranged at an upper part.

In this case, the process program and the parameter regarding "peak value" and "sectional area" are set in the characteristic point extraction category and the arithmetic category which constitute the measurement algorithm. The arithmetic formula of the sectional area S of the projection 3201 is as follows;

$$S=(h-u)\times(b-a)\times w\times 0.5 \quad (1)$$

where h is a peak height, u is an edge level, a is a left edge position (time data), b is a right edge position (time data) and w is work moving speed.

Since the work 3202 oscillates vertically when it is moved to the left in the figure, in order to calculate the edge level u accurately in view of an error caused by the oscillation, an edge reference level v is acquired at a position P (an edge level at position P) in which a predetermined time has passed after the trigger is turned on and a correction value z is added to this to provide an edge level u which is used in the arithmetic formula.

Figure 33:
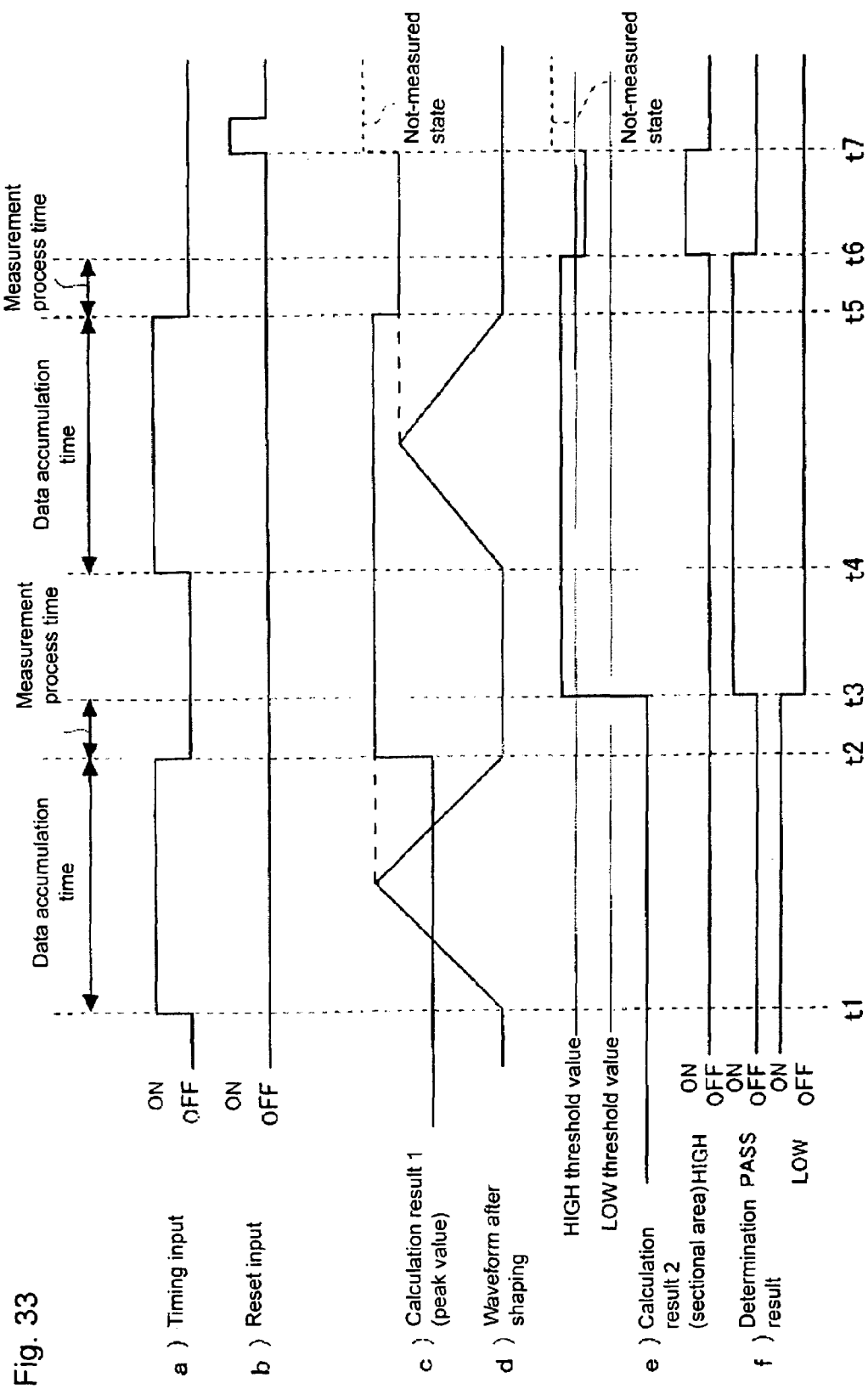
FIG. 33 shows a measurement timing chart of the sectional area measurement application.

The peak height h and the edge level u are obtained by the sequential type of measurement process and the left edge position a and the right edge position b are obtained by the accumulative type of measurement process. FIG. 33 shows a measurement timing chart at this time.

The measurement data (corresponding to the distance between the work and the displacement sensor) is started to be accumulated, at a timing t1 when a timing input shown by reference character a) in FIG. 33 is turned on (triggered on). A calculation result 1 (peak value) shown by reference character c) is sequentially updated and its peak value is established at a timing t2 when the timing input shown by reference character a) is turned off (triggered off). The left edge position a and the right edge position b are established between the timings t2 and t3, and the measurement process for a calculation result 2 (sectional area) shown by reference character e) is performed, whereby the sectional area S of the projection 3201 is calculated. When the calculated sectional area S exceeds a predetermined HIGH threshold value, a determination result shown by reference character f) is switched from LOW to PASS. In addition, the timing when the trigger is on is detected by an on signal of a separately provided photoelectric sensor or self-trigger.

Similarly, after the trigger is on at time t4, the measurement data is accumulated until time t5 when the trigger is off. The calculation result 1 (peak value) shown by reference character c) is sequentially updated between the times t4 and t5 and its peak value is established at the time t5. The left edge position a and the right edge position b are established between the times t5 and t6, and the measurement process for the calculation result 2 (sectional area) shown by reference character e) is performed, whereby the sectional area S is calculated. When the calculated sectional area S is between the predetermined LOW threshold value and HIGH threshold value, the determination result shown by reference character f) is switched from the output of PASS to the output of HIGH. In addition, the determination result is turned off when the reset input shown by reference character b) is turned on.

According to the above described sectional area measurement application, since the sequential type of measurement process is performed while the measurement data is accumulated, a time required for the measurement process can be shortened compared with the case where only the accumulative type of measurement process is performed.

Although the sensor system of the above embodiment is constituted by the displacement sensor as an example, the present invention is not limited to this and it may be constituted by a proximity sensor, a measuring sensor, or the like.

As described above, according to the sensor system of this embodiment, since the measurement algorithm is segmentalized, many more algorithms are freely constituted by combining the segmentalized process programs so as to correspond to the execution sequence of the process categories. In addition, since there is provided the predetermined application menu previously, it is easy to be used even by a beginner user. Furthermore, since the sequential type of measurement process and the accumulative type of measurement process are used together, the measurement time can be shortened.

What is claimed is:

1. A displacement sensor system comprising a displacement sensor having a measurement value acquisition unit for acquiring a displacement measurement value, a measurement value processing unit for processing the displacement measurement value acquired by the measurement value acquisition unit, and a process result output unit for outputting a result provided in the measurement value processing unit, and a high-order apparatus such as a personal computer which is connected to the displacement sensor through communication, wherein the high-order apparatus comprises a display unit and a process program set unit, the process program set unit performs a display process in which information necessary for setting the process program is displayed on the display unit, the display process comprises:

a process for displaying at least three processes such as waveform shaping, characteristic point extraction and calculation in process categories in this order, a process for displaying a process program number list in which the process programs can be registered in process execution sequence in each process category, and a process for displaying a process program option list for each process category, and the measurement value processing unit of the displacement sensor performs measurement value processes registered in the process program number list in sequence of the list, and in sequence of the process program numbers in each process category.

2. A displacement sensor system according to claim 1, wherein a displacement sensor comprises:

a storing part for storing one or more process programs in which measurement algorithm is sectionalized, together with their identification information and execution addresses by measurement stage in which execution sequence is predetermined, an input part for inputting the identification information and the execution sequence of the process programs to be executed by measurement stage, a table creating part for creating a measurement process table comprising the execution sequence input by the input part and the execution addresses read by the storing part, and a measurement stage based program executing part for reading and executing one or more process programs by measurement stage based on the measurement process table.

3. An extension unit applied to a multiple displacement sensor system comprising an amp unit row in which one or more amp units constituting an amp isolated type of displacement sensor are adjacently provided, and a transmission line connected to each amp unit constituting the amp unit row and transmitting measurement data generated in each amp unit in one direction, connected to and provide adjacent to the amp unit positioned at an end on the downstream of the transmission line in the amp unit row similar to the amp unit, and comprising a storing part for storing one or more process programs in which measurement algorithm is sectionalized together with their identification information and execution addresses by measurement stage in which execution sequence is predetermined, an input part for inputting the identification information and the execution sequence of the process programs to be executed by measurement stage, a table creating part for creating a measurement process table comprising the execution sequence input by the input part and the execution addresses read by the storing part, and a measurement stage based program executing part for reading and executing one or more process programs by measurement stage based on the measurement process table.

4. The extension unit according to claim 3, wherein the input part can receive communication from a high-order apparatus such as a personal computer.

5. The extension unit according to claim 3, wherein the process program is constituted such that a predetermined parameter can be set.

6. The extension unit according to claim 4, wherein the high-order apparatus is provided with a first setting system in which programs to be executed by measurement stage can be registered or deleted, and the setup parameter of the program can be changed, and a second setting system in which the setup parameter of the program can be changed.

7. The extension unit according to claim 4, further comprising a rewritable storing part for storing identification information of the process program received from the high-order apparatus and its execution sequence.

8. The extension unit according to claim 7, wherein predetermined measurement algorithm is stored in the rewritable storing part.

9. The extension unit according to claim 3, comprising:

a first step of defining start and finish of a measurement process according to a signal from the outside or a self-trigger, a second step of removing a noise from waveform data output from a detection end, a third step of extracting a characteristic point from a shaped waveform, and a fourth step of performing a predetermined calculation based on the extracted characteristic point.

10. An extension unit comprising an amp unit row in which one or more amp units constituting an amp isolated type of displacement sensor are adjacently provided, and a transmission line connected to each amp unit constituting the amp unit row and transmitting measurement data generated in each amp unit in one direction, and connected to a transmission line similar to the amp unit and provided adjacent to the amp unit positioned at an end on the downstream of the transmission line in the amp unit row wherein the extension unit comprises:

a storing part for storing one or more process programs in which measurement algorithm is sectionalized together with their identification information and execution addresses by measurement stage in which execution sequence is predetermined, an input part for inputting the identification information and the execution sequence of the process programs to be executed by measurement stage, a table creating part for creating a measurement process table comprising the execution sequence input by the input part and the execution addresses read by the storing part, and a measurement stage based program executing part for reading and executing one or more process programs by measurement stage based on the measurement process table.

* * * * *